June 8, 1965   R. R. CHARBONNEAU ETAL   3,188,266
INTERFACE BONDING OF POLYMERS AND PRODUCT THEREOF
Filed Sept. 3, 1963

INVENTORS
ROBERT R. CHARBONNEAU
JOSEPH F. ABERE
BY
Carpenter, Abbott, Coulter & Kinney
ATTORNEYS United States Patent Office 3,188,266
Patented June 8, 1965

3,188,266
INTERFACE BONDING OF POLYMERS AND
PRODUCT THEREOF
Robert R. Charbonneau, Woodbury Township, Washington County, Minn., and Joseph F. Abere, White Bear Lake, Minn., assignors to Minnesota Mining and Manufacturing Company, St. Paul, Minn., a corporation of Delaware
Filed Sept. 3, 1963, Ser. No. 306,065
18 Claims. (Cl. 161—188)

This application is a continuation-in-part of our copending applications Serial No. 547,325, filed November 16, 1955, now abandoned, and Serial No. 695,532, filed November 12, 1957. In one aspect this invention relates to novel films, which have important uses in the packaging field. While not limited thereto, our novel films have important application in the field of heat-sealed packages. In another aspect this invention relates to a new and useful method for self-bonding organic polymers to one another in the formation of various coated and laminated polymeric film and coating constructions.

Heretofore heat-sealable moistureproof cellophane has been widely used and has been commonly heat-sealed in conventional heat-sealing packaging machinery, the heat-sealing occurring at moderately elevated temperatures in the range of 275° F. to 400° F. Heat-sealing moistureproof cellophane came into wide usage commercially around 1930 or soon thereafter. The conventional heat-sealing moistureproof cellophane consists of a regenerated cellulose film coated with a nitrocellulose layer. It provides much greater moistureproofness than does ordinary uncoated cellophane, which had earlier been used, and has been widely used for the last 20 years or more for the packaging of bakery goods, meats, dried peas and various other grocery items, hardware items, etc. However, ordinary moistureproof cellophane is only relatively moistureproof and it is usually not recommended as a transparent packaging material for powdery materials such as dried milk, soft drink powders, hygroscopic drug or chemical powders, etc. Indeed ordinary hard candies packaged in moistureproof cellophane, when allowed to stand for a period of time under hot, humid atmospheric conditions, become stuck together in a manner undesirable from the merchandising viewpoint. In spite of its shortcomings, however, ordinary heat-sealable moistureproof cellophane heretofore has been, by far, the most widely used heat-sealing packaging material, making up on the order of 70% of the recent transparent packaging film market.

In an effort to provide a more moistureproof material, suitable in packaging many things for which ordinary heat-sealing moistureproof cellophane is not satisfactory, a polyethylene coated cellophane film has been put on the market relatively recently and has had a considerable usage, although the volume of its usage has been very small compared with that of ordinary moistureproof cellophane. It has the advantage that it lends itself to use in conventional heat-sealing equipment, available all over the country. It also has the advantage that it has added moistureproofness so as to make it suitable for packaging things like powdered sugar, dried soft drink mix, etc., for which conventional moistureproof cellophane is not sufficiently moistureproof to be useful. However it has the disadvantage that it is subject to delamination, in that the outer layer of cellophane is sensitive to water and humidity conditions, becoming flimsy if the package becomes wet on the outside, and becoming relatively brittle under very dry conditions, such as are encountered in many homes and buildings in the northern part of the country in the winter time.

Also in recent years plain polyethylene film has been used in making transparent packages. It does not lend itself to heat-sealing on ordinary conventional jaw type heat-sealing packaging machinery, such as has been well known in the case of sealing moistureproof cellophane; but special techniques have been developed by which packages have been made from straight polyethylene. Nonetheless, these techniques require closer supervision and are not nearly so widely usable as the conventional type of equipment used to heat-seal moistureproof cellophane. Additionally, polyethylene has the shortcoming that in film form, i.e., no greater than about 10 mils thick, it is quite readily permeated by oxygen (undesirable in foodstuffs), and by solvent vapors, many aromatic materials (odors, bouquets, etc.), vegetable oils, etc., all of which limit the acceptability of polyethylene film as such for wide use in the packaging field.

Other films, making up less than 20% of the packaging industry, include rubber hydrochloride films such as the so-called "Pliofilm," of Goodyear Tire and Rubber Company, vinylidene chloride based films such as "Saran," made by Dow Chemical Company, vinyl chloride-vinyl acetate copolymer, cellulose acetate, and polyester films such as "Mylar," a polyethylene terephthalate polyester film made by E. I. du Pont de Nemours & Co. None of these materials lend themselves to ready use on the most widely available types of heat-sealing packaging machinery. The rubber hydrochloride films have a relatively low maximum use temperature, e.g., about 200° F., and these films present a distortion problem. Vinylidene chloride films, in the thin gauges used in packaging, are very difficult to handle on packaging machinery, and have a very narrow range in which a heat-seal can be effected. Additionally, they present a problem with static electricity. Also, when a vinylidene chloride film is heat-sealed, this causes shrinkage and puckering, which spoils the attractiveness of the package which it is desired to preserve.

Vinyl chloride-vinyl acetate copolymer films, used to a very limited extent in the packaging field, cannot be heat-sealed on conventional packaging machinery, and only with difficulty, for example, by the use of electronic methods, can the films be fused or welded together. Additionally these films have a relatively low maximum use temperature and, unless highly plasticized, are not useful at low temperatures; and if highly plasticized they present plasticizer problems in respect to migration, staining, toxicity, etc. Cellulose acetate films offer no protection against moisture vapor and cannot be heat-sealed by conventional cellophane heat-sealing methods. Polyester films, such as "Mylar" and similar films of other organic polymers having polyester linkages in the polymer chain, while providing great strength and many advantages, never had any substantial use in the packaging field prior to our invention. The polyester films could be heat-sealed only at quite high temperatures. Such films melt at around 490° F., and the polymer degrades at a temperature very close to that required for heat-sealing. The polyester films are not heat-sealable on any conventional heat-sealing packaging machinery, and none had been developed prior to this invention to make polyester films usable to any substantial extent for packaging.

Some attempts were apparently made heretofore to laminate another film to a polyester film, so as to make a polyester film useful in packaging. Some efforts were made to laminate a film of polyethylene to a polyester film, but all such efforts resulted in a film which would not remain bonded at the interface between the polyester and the polyethylene under conditions of usage, being subject to delamination under such ordinary conditions as high humidity in the ambient atmosphere.

Thus prior to our invention moistureproof cellophane made up the great majority of the heat-sealing packaging material used, with the other materials mentioned above being used in lesser quantities and for limited purposes.

No one had found any feasible way to use polyester films such as so-called "Mylar" in the heat-sealing packaging field, even though polyester films are readily available in oriented form and have tremendous tensile and impact strength, and flexibility and stability over a wide range of temperatures.

It was a purpose of our invention to devise a film material which, although not limited thereto, would have wide use in the packaging field, and we were especially concerned to provide a film which could readily be heat-sealed.

It is an object of our invention to provide a packaging film the layers of which cannot be mechanically separated, which film is much more resistant to moisture and prolonged contact with water than is moistureproof cellophane, and which film also is more stable and flexible with wide changes in temperature and atmospheric conditions. A further object is to provide a packaging material which can successfully package watery or oily materials, and which has good resistance to penetration by moisture, oxygen, aromatics, solvent fumes, etc. These and other objects and advantages will become apparent from the description as a whole.

An important embodiment of our invention consists of a thin, strong, tough, heat-resistant oriented polyester film coated with a thin heat-sealable layer of polyethylene to provide a total film thickness of from about 1 to about 10 mils, and preferably from about 1 to 5 mils, with the polyester and polyethylene layers of the film being so bonded together at the interface that the film cannot manually be pulled apart under normal conditions of temperature and humidity, and any attempt to mechanically separate the layers results in rupture of the heat-sealable polyethylene portion of the film. Efforts of others, as above referred to, to laminate a polyethylene film to a polyetster film, uniformly resulted in a film which could be readily delaminated by manually pulling the two films apart under normal conditions of temperature and humidity.

If our film, as for example the embodiment made with a polyester coated with a polyethylene and strongly bonded at the interface, is used to make a package in which a vegetable oil or the like is enclosed, while the vegetable oil may and undoubtedly does penetrate the surface of the inside layer, which is the polyethylene layer, to some extent, yet it does not loosen and rupture the bond at the interface between the polyester film and the polyethylene coating. Further, if such a package is subjected to an ambient atmosphere of about 100% relative humidity and a temperature of 120° F., although the moisture undoubtedly penetrates the outer polyester film, even after many hours of such exposure there is no loosening and rupture of the bond between the polyester film and the polyethylene coating of our structure. On the other hand, if a film made by laminating a polyethylene to a polyester, according to the approach used by others, is formed into a package to enclose the same oil or subjected to such temperature and humidity conditions, the two films will start to separate at their interface within a few hours, resulting in a package which is commercially unsatisfactory. As soon as separation at the interface begins, with oil or moisture between the polyethylene film and the polyester film, the appearance of the package is already marred and this separation will continue to the edge of the package, resulting in leakage and a messy condition, making the material worthless as a substitute for other packaging media.

The preferred method for forming the films of this invention is in itself new and, in addition to providing a simple, reproducible procedure for making these new packaging films, can also be used to adhere a wide variety of polymeric surfaces to one another in the formation of adhesive tapes and sheet materials, coated abrasives, coated fabrics, coated fibers and other coated or laminated polymer constructions.

Briefly, the method of the invention involves forming an interface between the surfaces of organic polymers, one of which is more transmissive to ultraviolet light at wavelengths which pass through air at atmospheric pressure, e.g., from about 2000 A. to 4000 A., than the other, and then strongly irradiating the interfacial area with ultraviolet light at such wavelengths at an intensity and for a time sufficient to provide the desired bonding action between the polymers without causing substantial degradation of either polymer. The two polymers thus bonded together without the use of any adhesive materials are sometimes hereafter referred to as being "self-unified."

Since most organic polymers are soluble in appropriate solvents, one, usually the more ultraviolet transparent, may normally be applied to the other as a coating while such other is in solid form as a self-sustaining film, pellicle or fiber. Another procedure which is suitable in many instances is to coat one polymer from a dispersion. In some instances, however, it is desirable to invert the procedure and apply the less ultraviolet transparent polymer to the more ultraviolet transparent polymer, as where the latter is a massive article. In most cases, the softening points of the polymers are sufficiently different so that the materials are effectively brought into continuous contact, i.e., an interface is formed, by first melting the surface layer of the organic polymer. If one of the polymers is a plastic, its surface layer may be softened sufficiently under pressure alone to form an interface with the polyester.

After forming the interface between the polymers, the interface is irradiated with intense ultraviolet light in a wavelength range of 1850 A. to 4,000 A. Preferably the intensity of the radiation in the ultraviolet region is many times greater than the ultraviolet content of the noonday sun. By properly controlling the light intensity and the duration of the irradiation, an effective bond of the interfacial surfaces is realized without substantial degradation of polymer, which bond is the result of chemical interaction between organic polymers. The nature of the chemical reaction is not fully understood, but in each case a remarkably effective bond is attained as shown by the force necessary to mechanically disrupt the bond, by the improved resistance of the bond to solvent attack, by increased strength of the bond after aging, or by a combination of such manifestations. That the interfacial bond created by the ultraviolet irradiation is the result of chemical interaction rather than physical in nature is also evidenced by the fact that treatments of the interfacial area which might improve a physical bond without inducing chemical reaction, such as heating of the interface, do not produce bonds comparable to those obtained in the practice of this invention.

A number of artificial sources of radiation were available at the date of filing of application Serial No. 547,325. An air-cooled, high pressure mercury vapor lamp which requires about 900 to 1000 watts, which has about a one inch arc, a brightness of about 65,000 lumens, and which operates at a pressure of about 200 atmospheres was used for much of the experimental work reported below. Approximately ten percent of its radiation is at frequencies below about 3000 A. units, and it has a fairly continuous emission spectrum extending to about 2220 A. except in the vicinity of 2550 to 2600 A. Such a lamp is marketed by the General Electric Company under the designation B–H6.

Much of the work reported in the specific examples following was performed with the General Electric B–H6 lamp. Unless otherwise noted, the lamp was mounted in a lightproof box containing no reflector or other light-directing means. The box was provided with an opening across which articles to be irradiated were drawn on a moving belt at measured rates of speed. In most cases the opening measured five inches in the direction of belt movement, and the time of exposure was recorded as the time interval during which a point on the article being irradiated was located within such opening. Unless otherwise noted, the articles were passed beneath the lamp only once.

The B–H6 lamp mounted in this box could be adjusted vertically with respect to the moving belt and was often moved to a distance of only 2¾ inches. At this distance, the edges of a five inch exposure window are about 3.7 inches from the lamp, and the angle of incident light is considerably lessened. Allowance should be made for this fact in evaluating the experimental data.

Another lamp which has proved to be useful in this invention is a high pressure, 3000 watt lamp having an effective arc of 48 inches, with a transmission characteristic very similar to the B–H6 lamp. This lamp has proved to be effective for irradiating continuous polyester films at least four feet in width to establish the feasibility of practicing this invention in large scale operations as will be pointed out in greater detail below. A lamp with these characteristics is obtainable from the Hanovia Chemical & Mfg. Co. as the UA–15.

The article to be irradiated is conveniently passed on a moving belt or as a self-sustaining web horizontally through a box fitted with the high intensity light source, and either the rate of movement, the number of passes, or the number of lamps may be adjusted according to the requirements of the particular article. Ordinarily the interface may be irradiated from either side but it is essential that the layer between the interface and the light be at least partially transmissive of ultraviolet light. For obvious reasons of economy, the duration of radiation is preferably held to a minimum so that the layer less absorptive of ultraviolet light is preferably faced toward the source of light, which layer normally is the organic polymer.

The intensity and duration of radiation required varies considerably according to the organic polymer combination being irradiated and an exposure required to effect a desired bond in one case might produce deleterious results in another. The irradiation may be accompaned by forced air cooling of either the lamp or the article being irradiated or both. However, for a given pair of polymers, the length and intensity of exposure and the degree of attendant heat may usually be varied over fairly wide limits without appreciable change in the quality of the product. In general, the exposure should be increased in proportion to the thickness of the layer between the light and the interface.

It should be pointed out that considerable variation in intensity is encountered in using high pressure lamps of the character described. As a lamp ages, its radiation becomes less intense, particularly as it nears the end of its useful life. During a single use of the lamp without turning it off, this effect is not discernible, in the practice of this invention, but the mere act of turning the lamp off and back on can result in a considerably reduced intensity. Unless otherwise noted, all data obtained in a given example recorded herein was obtained while the lamp burned continuously. It should also be noted that a substantial difference in intensity of radiation can exist in a pair of new and ostensibly identical lamps.

In the drawing accompanying the application there is illustrated in FIGURE 1 a roll of adhesive tape comprising a tape backing having an adhesive coating thereon as noted on the drawing legends, which tape is made in accordance with the teachings of this invention.

In the examples following, products of the kind illustrated in the drawing, as well as other products, are made.

In the first group of examples, namely, Examples 1–29, the practice of this method and its use to strongly bond various coatings and film overlayers to polyester substrates in the formation of a wide variety of products is illustrated. In the second group of examples, namely, Examples 30–38, the novel film structures of this invention are illustrated in conjunction with preferred methods of their formation.

The invention is illustrated by the following examples without intent to be limited thereto.

EXAMPLE 1

Crude rubber was coated with squeeze rolls from a 10 percent solution in heptane onto oriented polyethylene terephthalate film and dried for about 1.1 to 1.5 minutes at about 70° C., yielding a dry coating weight of approximately 0.2 grain per 24 square inches. A long, six-inch wide strip of the coated film was passed beneath a General Electric B–H6 lamp, coated side up, at a speed of about two yards per minute. The lamp was mounted in a light-proof box having an exposure window about 5¾ inches wide measured in the direction of movement of the coated film. The lamp was centered over the film at a height of about 1.5 inches. No reflector was provided for directing the radiation. The crude rubber was then overcoated with a pressure-sensitive adhesive based on crude rubber and polyterpene resin, wound into a roll, and slit into widths of ½ and ¾ inches. Another set of rolls of pressure-sensitive adhesive tape were prepared as a control, following the identical procedure except omitting the radiation step.

A sample slit from the center of the irradiated tape was fastened to a steel plate with its adhesive side up, and a reference adhesive tape selected for its great internal strength was pressed adhesive side down under a 4.5 pound hard rubber roller against the sample being tested. The force required to peel the upper tape back from the tape under test at an angle approaching 180 degrees and at the rate of 45 inches per minute was found to be about 80 ounces per half inch as compared to about 37 ounces per half inch required to remove the reference tape from the unirradiated control sample under the same conditions. Of special importance was the fact that no adhesive was removed from the irradiated tape by the reference tape whereas the adhesive with the crude rubber primer layer was stripped cleanly from the control sample.

It should be noted that because the reference tape failed to remove any adhesive or crude rubber primer from the irradiated sample, the bond measured quantitatively was that between the two adhesive surfaces. Some delamination must take place in the tape under test before the strength of that tape is fully assessed.

The reference tape used in this example and in the examples below to obtain quantitative stripping data consisted essentially of a cellophane backing, sub-coated with an adhesive priming layer of latex rubber and formaldehyded polyvinyl alcohol, and further coated with an adhesive layer of a heat-treated mixture of rubber, tackifier resin, and oil-soluble heat-advancing rubber-reactive phenol-aldehyde resin having high internal strength but low adhesion value. When this reference tape was pressed by one pass of a 4.5 pound hard rubber roller on a stainless steel plate which had been polished to a mirror surface, a force of only 4 to 8 ounces per half inch width was required to strip the tape from the plate at an angle of 180 degrees and at a speed of 45 inches per minute. In contrast, a general purpose pressure-sensitive adhesive tape is stripped from the same plate under the same conditions under a force in the range of about 30 to 50 ounces per half inch; for example, the pressure-sensitive adhesive tapes evaluated in this example required a stripping force of about 30 ounces per half inch.

In a "hand-picking" test, two strips of the irradiated pressure-sensitive adhesive tape were pressed together adhesive sides inwardly and then pulled squarely apart by hand. The two strips separated cleanly without delamination of either. In contrast, when two strips of the non-irradiated control sample were pulled apart, one strip delaminated with its adhesive and primer coatings transferring completely to the other. The pressing of an irradiated tape against a non-irradiated control sample resulted, upon separation, in the adhesive and primer of the control transferring to the irradiated strip.

The rolls of tape slit from the edges of the six-inch irradiated strip were subjected to the same hand-picking test and appeared to have internal strength almost equal to that of tapes slit from the center of the strip and much greater than the control tapes. Both the tapes slit from the center and those slit from the edges of the irradiated strip were of excellent commercial quality, adhering strongly to paper or cardboard from which they could not be removed without carrying away fibrous material. They also adhered well to glass and metal and could be stripped off suddenly without any delamination.

EXAMPLE 2

A strip of high tensile strength, oriented polyethylene terephthalate polyester film was coated with about 0.2 grain per 24 square inches of a rubbery butadiene-styrene (75:25) copolymer, applied as a 16 percent solution in heptane by means of squeeze rolls and then dried. The strip was irradiated through the coated side with a B–H6 lamp mounted at a distance of 1½ inches above the central area of the 6-inch strip traveling through the apparatus described in Example 1 at a speed of 2 yards per minute. The treated strip was then further coated with a layer of pressure-sensitive adhesive as in Example 1. A portion of the polyester strip was similarly coated but not irradiated, and served as a control.

Segments of the coated products were pressed against the coated test surface and tested for removal effort, all as described in Example 1. At a pull of about 37 ounces per half inch width, the control sample failed by splitting along the interface between the polyester film and the rubbery polymer. The irradiated sample resisted removal stresses up to about 70 ounces per half inch, at which value the pressure-sensitive adhesive layer split, about three-fourths of the adhesive offsetting to the test surface.

Tested by hand-picking as previously described, the control sample invariably failed at the polyester film surface, whereas the irradiated sample showed no failure in this test.

EXAMPLE 3

A strip or oriented polyethylene terephthalate film was coated with a latex of butadiene/styrene (50:50) copolymer by rubbing the film with cheesecloth saturated with the latex until a thin, continuous coating was obtained. The coated film was irradiated through the latex coating for six seconds with a B–H6 lamp at a lamp-to-film distance of 2¾ inches and then overcoated with a layer of a pressure-sensitive adhesive based on the same copolymer. The pressure-sensitive tape thus prepared showed good resistance to delamination when two layers of the tape were pressed face to face and drawn squarely apart by hand. A control tape similarly prepared but without the irradiation step failed in this test by offsetting of adhesive and primer.

Good quality pressure-sensitive adhesive tapes were obtained using the same adhesive and oriented polyester film with other polymeric primer layers, for example:

Butadiene/alpha-methyl styrene (75:25)
Butadiene/styrene (30:70)
Butadiene/vinylpyridine (85:15)
Polychloroprene Each of the foregoing was coated on the polyester film from solution and irradiated through the coating for six seconds with a B–H6 lamp at a 2¾ inch lamp-to-film distance.

A set of adhesive tapes of commercial quality was prepared using a polyacrylate ester rubber-resin type pressure-sensitive tape adhesive. The following primers proved to be successful with this adhesive:

Terpolymer of vinyl chloride/vinyl acetate/maleic anhydride ("Vinylite VMCH")
A mixture of equal parts of nitrocellulose and polybutylmethacrylate
Polyvinyl butyral After each of these adhesive primers was coated from solution on the oriented polyethylene terephthalate film, the interface thus created was irradiated through the primer by 5 separate exposures of 12 seconds each with the B–H6 lamp at a 2¾ inch lamp-to-film distance. Each of these pressure-sensitive adhesive tapes thus prepared showed a marked improvement in resistance to hand-picking over tapes identically prepared except for the omission of the step of irradiation.

EXAMPLE 4

Crude rubber in a five percent solution in heptane was coated to a 1.5 mil wet thickness on oriented polyethylene terephthalate film and immediately exposed to the B–H6 lamp for six seconds at a distance of 2¾ inches with the crude rubber layer facing the lamp. The coating was then dried, and its adhesion to the polyester film was tested by attempting to remove it by hand using pressure-sensitive adhesive tape. Although there was no perceptible difference in surface tack or in appearance between the irradiated sample and a non-irradiated control sample, the irradiated sample was not delaminated by hand-picking, while the crude rubber layer of the control sample readily transferred to the pressure-sensitive adhesive tape.

EXAMPLE 5

Tensilized polyethylene terephthalate polyester film, 1 mil in thickness, was coated with a solution of a pressure-sensitive adhesive based on milled crude rubber and polyterpene resin. After drying of the coating, this sample was drawn with the coating side up beneath a General Electric B–H6 lamp at a lamp-to-film distance of less than one inch. A hole was burned through the polyester film at the starting point, and the rest of the film was slightly wrinkled. The adhesive around the edges of the hole was not removed when a pressure-sensitive tape was pressed adhesive side down against the crude rubber layer and pulled squarely away by hand, whereas the same hand-picking test easily removed the crude rubber coating of a non-irradiated sample. The lamp was positioned about an inch above the center of the exposure window. One sample of the tape was not irradiated and served as the control.

Each sample of the tape was subjected to the stripback test with the reference tape as described in Example 1. When stripped at an angle approaching 180 degrees in a test comparable to that described in Example 1, an improvement in adhesion from about 37 ounces per half inch for the non-irradiated sample to about 60 ounces per half inch for the irradiated sample was obtained. The non-irradiated sample delaminated cleanly between the adhesive layer and the polyester backing whereas the bond between the adhesive and backing of the irradiated sample was disrupted in only about 25 percent of the area under test, with about 75 percent of the adhesive remaining attached to the polyester backing. When stripped at an angle approaching zero degrees, the improvement was from about 7 ounces per half inch for the control sample to about 26 ounces per half inch for the irradiated product. The irradiated tape of this example was acceptable for many commercial purposes, whereas the control sample was not.

Despite the improvement provided by irradiation of the polyester-adhesive interface in this example, it is normally preferred to coat the polyester film with a thin primer layer and to irradiate through that layer alone, for the reason that an exposure of less duration is then required to effect an equally strong bond; and in the commercial production of adhesive tape, the speed at which the tape may be produced is of prime importance. Another fact bearing consideration is that overly long exposures tend to degrade crude rubber and to reduce the effectiveness of the rubber-resin adhesive.

The effect of overexposure is brought out in Table A, in which results in terms of stress required to cause failure of the film-to-adhesive interface are obtained using pressure-sensitive adhesive tapes prepared with the same crude rubber-polyterpene resin adhesive and irradiated by the B–H6 lamp through the entire adhesive layer at a lamp-to-film distance of about 2¾ inches. The tapes were drawn across the exposure window at various speeds to effect a variety of periods of exposure. In making the tests reported under columns 4 and 5, the reference tape described in Example 1 was pressed against the adhesive tape held against a flat surface and stripped back at an angle approaching 180 degrees from the tape being tested to determine the "180° Stripback" value, and the percentage transfer of adhesive from the sample to the test surface was estimated.

To test the effect of the radiation on the adhesive qualities of the pressure-sensitive adhesive tape, as reported in columns 6 and 7, each sample was laid adhesive side down against cellophane, previously securely fastened to a steel plate, and adhered thereto by passing a 1500 gram roller over the contacted films six times. The force necessary to strip the tape under test at an angle of 90 degrees with the plane of the cellophane was measured using an Instron Tensile Tester, samples being tested at each of two different removal speeds as reported in the table.

The Instron Tensile Tester is equipped with two jaws, one of which moves away from the other at an adjustable speed while the force opposing that movement is automatically recorded.

dried. Samples of the coated film were irradiated through the primer layer with a General Electric B–H6 lamp for six seconds at lamp-to-film distances varying from 2¾ inches to 11¾ inches. The primer layer of each sample was then overcoated with the pressure-sensitive adhesive used in Example 1.

The samples were tested using the reference tape described in Example 1 but with a different type of test than was used in that example. Here a half-inch strip of the reference tape was securely fastened, adhesive side up, to the rim of a wheel in the circumferential direction. A somewhat wider strip of the tape being tested was fastened circumferentially to the rim of a similar wheel. The wheels were rotated in contact at peripheral speeds of two inches per minute under a force of four kilograms, and the force required to overcome the adhesion of the two tapes was measured as the "picking" value of the tape under test. The test may also be thought of as giving the stripping force of the reference tape from the pressure-sensitive adhesive tape under test at an angle aproaching 0 degrees.

The sample irradiated at a lamp-to-film distance of 11½ inches delaminated completely between the primer and backing under a stress of 30 ounces per half inch, which stress was only a few ounces greater than that required to delaminate an unirradiated sample. The sample irradiated at a lamp-to-film distance of 9¼ inches resisted delamination up to a stress of 38 ounces, at which stress the bond between the adhesive and primer layers was partially disrupted, but no primer was removed from the backing. The sample irradiated for six seconds from a 7½ inch distance resisted a delaminating stress of 44 ounces per half inch without incurring any delamination. Samples irradiated at lamp-to-film distances of 5½ inches and less were found to be inferior to the sample irradiated from a distance of 7½ inches in their resistance to delaminating stresses but were considerably superior in this respect to non-irradiated samples.

*Table A.—Effect of time of irradiation on properties of tape product*

| Adhesive grains per 24 sq. in. | No. of exposures | Total exposure in seconds | 180° stripback of reference tape | | 90° stripback from cellophane, oz./½ in. | |
|---|---|---|---|---|---|---|
| | | | Oz./½ in. | Percent adhesive transfer | 0.2 in./min. | 20.0 in./min. |
| 5.5 | 0 | 0 | 42 | 100 | 3.8 | 14.0 |
| | 1 | 10 | 68 | 0–5 | 3.2 | 16.0 |
| | 3 | 30 | 65 | 0 | 5.8 | 25.0 |
| | 6 | 60 | 54 | 0 | 2.0 | 27.5 |
| | 10 | 100 | 51 | 0 | 0.5 | 14.0 |
| 9.0 | 0 | 0 | 58 | 100 | 2.6 | 20.0 |
| | 1 | 3⅓ | 60 | 100 | -------- | -------- |
| | 1 | 5 | 63 | 100 | 2.0 | 19.0 |
| | 1 | 10 | 72 | 40 | -------- | -------- |
| | 2 | 15 | 68 | 0 | 6.9 | 23.0 |

It is of considerable interest that moderate exposure to ultraviolet light of the interface between the polyester film and the crude rubber-polyterpene resin adhesive of this example not only creates a strong interfacial bond but increases the adhesion value of the adhesive. It should be noted in this connection that values of more than about 3 ounces per half inch at 0.2 inch per minute and more than about 15 ounces per half inch at 20 inches per minute in stripping a pressure-sensitive adhesive tape from cellophane in this test indicate an adhesive of good commercial utility. Adhesion values at low stripping rates, e.g., 0.2 inch per minute are considered to be less accurate than those obtained at relatively fast rates, e.g., 20 inches per minute.

EXAMPLE 6

Oriented polyethylene terephthalate film was coated with an adhesive primer layer of crude rubber in five percent solution to a wet thickness of 1.5 mils and then The data show that improvement in the resistance to delamination of the pressure-sensitive adhesive tape may be realized by irradiation of the prime-coated film over a wide range of lamp distances and times of exposure, but also indicate that within fairly broad limits, optimum conditions for bonding do exist.

EXAMPLE 7

A number of strips of tensilized polyethylene terephthalate polyester film were coated to various thicknesses with primer layers of crude rubber, the dry coatings ranging from 0.56 to 2.11 grains per 24 square inches. Each was irradiated through the rubber primer with a B–H6 lamp for the same period of time, and further coated with a pressure-sensitive adhesive. Each of the pressure-sensitive adhesive tapes thus prepared yielded the same value for stripback adhesion at 180 degrees by the reference tape described in Example 1 and was equivalent to the product of Example 1.

The experiment was repeated using for the primer layers the rubbery copolymer of butadiene and styrene (50:50.) Pressure-sensitive adhesive tapes were prepared by knife-coating the copolymer from solution onto tensilized polyethylene terephthalate film, exposing the tape through the coating to the B–H6 lamp for six seconds at a 2¾ inch lamp-to-film distance, and overcoating with a pressure-sensitive adhesive based on the same rubbery copolymer. Coating weights and stripback forces at an angle approaching 180 degrees with the reference tape of Example 1 are recorded in Table B.

*Table B*

| Dry coating weight, Grains per 24 in.² | Stripback at 180° relative values |
|---|---|
| 0 | 53 |
| 0.19 | 101 |
| 0.63 | 80 |
| 1.38 | 70 |
| 2.67 | 58 |

Each of the samples experienced at least some delamination between the primer layer and polyester backing or, in the case of the unprimed sample, between the adhesive layer and the backing. However, the sample with a primer coating of 0.19 grain per 24 square inches was superior in this respect to the other samples and the sample with a 0.63 grain primer coating was, in turn, superior to the other sample.

That the resistance to delaminating stresses of the pressure-sensitive adhesive tapes prepared with a primer layer of the butadiene/styrene copolymer varied as a result of the lower intensity of the ultraviolet light at the primer-polyester interface in the samples of thicker coating was established by preparing a set of pressure-sensitive adhesive tapes using a relatively thick coating of the same butadiene/styrene copolymer as the primer layer. The primer was applied to high tensile strength polyethylene terephthalate film from a ten percent solution to yield a dry coating weight of approximately two grains per 24 square inches. Samples of this coated film were separately exposed through the primer with the B–H6 lamp at a lamp-to-film distance of 2¾ inches and for different lengths of time, and then overcoated with the same pressure-sensitive adhesive used in collecting the data for Table B. Stripback adhesion tests at an angle approaching 180 degrees using the reference tape of Example 1 yielded the data recorded in Table C.

*Table C*

| Exposure time in seconds: | Stripback at 180° relative values |
|---|---|
| 12 | 74 |
| 24 | 91 |
| 36 | 105 |

The sample irradiated for 36 seconds delaminated to a large extent between the primer and adhesive layers with almost all of the primer layer adhering to the polyester backing. Both the primer and adhesive layers of the samples subjected to shorter exposures were completely removed from the polyester backing and transferred to the reference tape.

The difference in behavior noted between crude rubber and butadiene/styrene copolymer in this example is believed to be due to the fact that crude rubber is far more transparent to ultraviolet light than the butadiene/styrene copolymer in the range below about 3000 A.

EXAMPLE 8

A number of organic polymers in five percent solution were knife-coated on oriented polyethylene terephthalate polyester film to a 1.5 mil wet thickness. After drying, each coated film was passed coated side up beneath the B–H6 lamp across a 5 inch exposure window at a rate of 50 inches per minute, corresponding to a six second exposure. The lamp-to-film distance was about 2¾ inches. A strip of pressure-sensitive adhesive tape was pressed by hand against the coating and drawn directly away. The film was examined closely, and if any of the coating had been transferred, the film was subjected to a further six-second exposure and the picking test was repeated. In Table D are listed various polymers tested and the number of passes and total exposure required before no coating was transferred. In each case, a non-irradiated coating was easily removed in the hand-picking test.

One of the organic polymers tested was the copolymer of isoprene and isobutylene (3:97), fifty percent of the unsaturation of which was taken up by bromine.

*Table D*

| Organic polymer | No. passes | Total exposure in seconds |
|---|---|---|
| Allo-ocimene/vinyl n-butyl ether | 2 | 12 |
| Brominated allo-ocimene/vinyl n-butyl ether | 3 | 18 |
| Brominated isoprene/isobutylene (3:97) | 14 | 84 |
| Isoprene/isobutylene (3:97) | 2 | 12 |
| Butadiene/acrylic acid (90:10) | 1 | 6 |
| Butadiene/vinyl pyridine (82:15) | 2 | 12 |
| Chlorosulfonated polyethylene | 1 | 6 |
| Guttapercha | 2 | 12 |
| Polychloroprene | 1 | 6 |
| Polyisobutylene | 5 | 30 |
| Polyvinyl acetate | 10 | 60 |
| Polyvinyl butyral | 14 | (¹) |

¹ Still transfers.

No significant change in tackiness or appearance of the surface of any of the polymers listed in Table D was produced as a result of the irradiation.

The foregoing experiment was repeated for the polymers listed in Table D which required long exposures. Only one change was made in procedure, that of reducing the rate of movement of the coated polyester film to 10 inches per minute, thereby exposing the film for 30 seconds in one pass. After one pass, each of the following primer coatings was firmly bonded to the polyester film as determined by hand-picking with pressure-sensitive adhesive tape:

Brominated isoprene/isobutylene (3:97)
Polyvinyl acetate
Polyvinyl butyral

EXAMPLE 9

Because it might be surmised from the previous example that heat may be a necessary factor in creating strong bonds between organic polymers and solid polymeric polyesters in the practice of this invention, experiments were performed to test this possibility. The housing for a B–H6 lamp was placed in contact with Dry Ice so that its metal bottom was cooled to about −50° C. A tensilized polyethylene terephthalate film coated with polychloroprene was placed in firm contact with the bottom of the housing. The lamp, which had not been used for some time so that the air in the housing was also cold, was then switched on for 10 seconds to irradiate the coated polyester film through the coating from a distance of 2¾ inches. The film was immediately removed and tested for adhesion of the polychloroprene by hand-picking tests. No difference could be detected between the adherency of the polychloroprene as compared to a sample prepared as in Example 8, which sample was heated to about 60° during irradiation. That is, in each case the polychloroprene was firmly bonded to the polyester backing as compared to the relatively weak bond between the same polymers in the control sample.

The experiment was repeated using polyvinyl acetate coated on tensilized polyethylene terephthalate film. After an exposure of 30 seconds, no improvement over non-irradiated samples was noted when the film was held at a temperature of −50° C., i.e., the coating was readily removed by picking with pressure-sensitive adhesive tape.

On the other hand, a sample allowed to rise to 70° C. during 30 seconds' irradiation showed excellent resistance to delamination. A third sample irradiated for 30 seconds under conditions controlled to maintain the temperature of the film at about ordinary room temperatures evidenced a slight increase in adherency as compared to the non-irradiated sample.

It is believed that certain organic polymers, particularly those such as polyvinyl acetate which dry to a hard, firm film when coated on a solid polyester, require a greater degree of kinetic mobility of molecules than is present at ordinary room temperatures in order to be strongly bonded to the polyester under the influence of ultraviolet radiation. The increased kinetic mobility apparently allows the molecules of the organic polymer to move more rapidly into optimum position for bonding to the polyester. The necessary increase in kinetic mobility is conveniently supplied by the heat emitted by the ultraviolet source.

Samples of polyester film coated with crude rubber were passed over a hot plate at varying distances and for varied periods of exposure without any observable increase in adhesion. No improvement in the anchorage of crude rubber to polyester film was evidenced by hand-picking tests when samples were warmed by a heat lamp to temperatures ranging from below 100° C. to those sufficient to degrade the rubber.

EXAMPLE 10

Various thicknesses of tensilized polyethylene terephthalate polyester film were each coated with polychloroprene to a 1.5 mil wet thickness from 5 percent solution and dried. In contrast to the usual procedure, the interfacial area was irradiated through the polyester film rather than through the organic polymer at the rate of about 25 inches per minute to give exposures of about 12 seconds. The lamp-to-film distance was in each case about 2¾ inches.

After each pass, the bond between the polychloroprene coating and polyester film was tested by pressing a strip of pressure-sensitive adhesive tape against the coating and drawing it away by hand perpendicularly. The tapes were then examined to determine whether any of the coating had transferred to the adhesive. The total exposure required in each case to effect a bond sufficient to prevent transfer of any of the polychloroprene coating is recorded in Table E.

*Table E*

| Polyester thickness in mils: | Total exposure in seconds |
| --- | --- |
| 0.25 | 24 |
| 0.5 | 24 |
| 1.0 | 36 |
| 2.0 | 60 |
| 5.0 | 96 |
| 7.5 | 120 |

When tensilized polyethylene terephthalate film having a coating of the same thickness of polychloroprene was passed under a B–H6 lamp at the same distance but with the coating side toward the lamp, a bond which resisted hand-picking was obtained after a single six-second pass.

EXAMPLE 11

The polyester of 1,4-butanediol and phthalic acid, 70 percent of which acid was of the meta form and 30 percent of the para form, was cast as a film on glass from a ten percent solution in equal parts of methyl ethyl ketone and toluene. Polychloroprene was applied to the dried polyester film by saturating a cheesecloth with a five percent solution and wiping the film until it was covered with a uniform layer of the polymer. After drying, several samples were irradiated through the coating with a General Electric B–H6 lamp at various exposures. It was found that a 12-second exposure at a lamp-to-film distance of 2¾ inches was sufficient to bond the polychloroprene to the polyester film so that it was not removed by hand-picking with pressure-sensitive tape, whereas without exposure, the polymer was easily stripped from the polyester film.

A latex of butadiene/styrene copolymer (50:50) was applied from a cheesecloth to another portion of the same polyester film, and various samples were irradiated through the coating from a distance of 2¾ inches with the B–H6 lamp. Picking tests with pressure-sensitive adhesive tape showed some anchorage of the copolymer to the polyester film after 24 seconds' exposure as compared to no resistance to hand-picking with substantially less exposure. The coating was not removed by hand-picking after a one minute exposure, which exposure did not produce an observable difference in the tackiness or appearance of the surface of the polymeric coating.

EXAMPLE 12

Tensilized polyethylene terephthalate film was coated to a 1.5 mil wet thickness with a 15 percent solution in acetone of cellulose acetate, which coating dried in 5 minutes at 65° C. to a clear, non-tacky film. When a pressure-sensitive adhesive tape was laid on the film and peeled off, the cellulose acetate transferred to the tape.

Irradiation with a B–H6 lamp through the cellulose acetate from a distance of 2¾ inches for varying exposures including 60 seconds did not anchor the film to the polyester backing to an extent necessary to prevent delamination with the pressure-sensitive adhesive tape. However, a continuous exposure of 90 seconds produced a bond which satisfactorily resisted delamination by the adhesive tape. The exposure had no perceptible effect on the cellulose acetate or the polyester backing.

Coatings of nitrocellulose, ethylcellulose, and alcohol soluble nylon were applied to tensilized polyethylene terephthalate film. Each dried to a clear, non-tacky state. After drying, each was passed beneath the B–H6 lamp at a 2¾ inch distance to effect a 6 second exposure through a five inch window. This exposure was in each case sufficient to bond the coating to the polyester backing to an extent that it could not be removed with pressure-sensitive adhesive tape, as contratsted to non-irradiated samples which in each case were easily delaminated.

EXAMPLE 13

A solution containing about 10 percent solids which consisted essentially of 100 parts by weight of a copolymer of butadiene and acrylonitrile (55:45), 85 parts of a copolymer of vinyl chloride and vinyl acetate (90:10) and 15 parts of a polyester of sebacic acid and propylene glycol was knife-coated to a 1.5 mil wet thickness on high strength, oriented polyethylene terephthalate film. After drying for 10 minutes at 65° C., the film was passed beneath a B–H6 lamp twice to obtain a total exposure of 12 sconds at a lamp-to-film distance of 2¾ inches. This coating was then overcoated with a uniform dispersion of two parts of acicular magnetic red iron oxide powder in one part of a binder, which binder consisted essentially of 85 parts of vinyl chloride/vinyl acetate copolymer (90:10) and 15 parts of the polyester of sebacic acid and propylene glycol, and was dissolved in a mixture of methyl ethyl ketone and toluene. The product was dried and slit into narrow strips.

The magnetic recording tape thus produced was compared to a control sample, which was identically prepared except for the omission of the irradiation step, by pressing pressure-sensitive adhesive tapes against the magnetic surfaces and peeling them off. The magnetic layer of the irradiated tape was not affected by the adhesive tape whereas that of the control sample was completely removed.

When the tape was folded magnetic coating outside and drawn quickly between the thumb and forefinger, magnetic oxide flecked off the control tape but not off the irradiated tape.

EXAMPLE 14

A copolymer of butadiene and styrene (50:50) was coated on a film of tensilized polyethylene terephthalate polyester. A light filter was prepared by applying a thin coating of a phenolic resin adhesive to cellophane, which filter was found to absorb light strongly below about 3000 A. while being largely transparent above that wavelength. This filter was used to mask off certain areas of the coated polyester film while it was exposed through the polymeric coating to ultraviolet radiation from a B–H6 lamp. The experiment was repeated for a variety of exposure times. Hand-picking with pressure-sensitive adhesive tape showed that the coating was strongly anchored to the polyester film only in the unmasked areas, whereas in the masked areas, the polymeric coating was easily removed by the pressure-sensitive adhesive tape. That is, no improvement in resistance to hand-picking was noted in the masked areas as compared to non-irradiated control samples.

A filter prepared from polystyrene film, 2 mils in thickness with an X-shaped opening cut therein, was interposed between the B–H6 lamp and another lamp of the same polyester film and butadiene/styrene coating. Polystyrene is an excellent filter for blocking radiation below about 2800 A. while passing nearly all wavelengths above that point. In every case after irradiation at a variety of exposures and lamp-to-film distances, no difference was discernible in the degree of adherence between the polymeric coating and polyester film in the masked areas as compared to the irradiated areas. Hand-picking with pressure-sensitive adhesive tape failed to remove any of the rubbery copolymer in either the areas exposed directly or in those exposed through the filter.

EXAMPLE 15

While most of the experimentation reported herein utilized the General Electric B–H6 lamp, any lamp emitting substantial ultraviolet radiation is suitable as is demonstrated by comparing results obtained in the practice of this invention with the B–H6 lamp to those obtained with the UA–15 lamp of the Hanovia Chemical & Mfg. Co. Like the B–H6 lamp, this is also a high-pressure mercury arc lamp although it operates at considerably lower pressures than the B–H6.

As used in work reported herein, the UA–15 was mounted in a light-proof box fitted with a crude reflector fashioned to approximate a parabolic reflector. The lamp was mounted about six inches above the platform on which samples to be irradiated were placed, and no provision was made for adjusting that distance. Below is a comparison of some characteristics of the two lamps.

|  | B–H6 | UA–15 |
|---|---|---|
| Input in watts | 1,000 | 3,000 |
| Distribution in watts: |  |  |
| Below 2,500 A | 10 | 100 |
| 2,500–2,800 | 21 | 205 |
| 2,800–3,200 | 75 | 230 |
| 3,200–3,600 | 13 | 25 |
| 3,600–3,800 | 116 | 150 |
| Visible light | 290 | 310 |
| Useful arc in inches | 1 | 48 |

To compare the performance of these two lamps in the practice of this invention, a length of oriented polyethylene terephthalate polyester film was precoated with a thin polyvinyl acetate lacquer layer by means of a squeeze roll, irradiated through the lacquer as indicated (with the B–H6 adjusted to a position 2¾ inches from the film) overcoated with the same lacquer to a 3 mil wet thickness, and dried. Laminates one inch in width were prepared from two layers of the polyester film, each treated as indicated, by placing their coated sides together on a hotplate at 300 ± 10° F. for several seconds. The laminates were tested by pulling them apart at an angle of 180 degrees on the Instron Tensile Tester at the rate of 2 inches per minute. The data obtained is noted in Table F below.

*Table F*

| Exposure in seconds | Stripback force, oz./in. | |
|---|---|---|
|  | B–H6 | UA–15 |
| 0 | 4 | 4 |
| 12 | 15 |  |
| 15 |  | 20 |
| 30 |  | ¹ 45 |
| 36 | ¹ 40 |  |

¹ Polyester film tore.

As a further comparison, a pressure-sensitive adhesive based on crude rubber and polyterpene resin was applied to oriented polyethylene terephthalate film to a nine mil wet thickness. After drying, samples were irradiated through the adhesive layer as indicated. The B–H6 lamp was again positioned about 2¾ inches from the film. The bonds were tested by pulling from the samples the reference tape described in Example 1 at a stripback angle approaching 180 degrees and at a rate of 20 inches per minute using the Instron Tensile Tester. The data obtained is given in Table G.

*Table G*

| Exposure in seconds | Stripback force, ox./½ in. | |
|---|---|---|
|  | B–H6 | UA–15 |
| 0 | 10 | 10 |
| 1 |  | 17 |
| 3 | 23 | 17 |
| 6 | 19 | 15 |
| 12 | 18 | 15 |
| 24 | 5 | 14 |

EXAMPLE 16

When rubbery butadiene/styrene copolymers are coated on polyester films from solutions freshly prepared from a latex, it is found that the bond created by irradiation of the interface with ultraviolet light is inferior to the bond created in the same manner except using a solution which had been stored as such for some time. The effect is independent of the age of the latex. Since the latex invariably contains an antioxidant which is not extracted along with the synthetic rubber by the solvent, the improvement resulting from storage is laid to oxidation.

This fact has been borne out by bubbling molecular oxygen through a solution of freshly extracted butadiene/styrene (50:50) copolymer for various periods of time followed by purging with nitrogen. As the oxygenation time was increased, an increase was realized in the strength of the bond between the rubbery copolymer and a film of tensilized polyethylene terephthalate film created by coating the oxygenated solution on the film and irradiating the interface with ultraviolet light. However, the oxygenation can be continued to such an extent that the bond strength begins to decrease with further oxidation.

However, the presence of atmospheric oxygen is not required during irradiation to produce the novel bonds as evidenced by experiments with crude rubber coatings applied to oriented polyester film in an evacuated desiccator and irradiated with ultraviolet light in a nitrogen atmosphere.

It has also been found that the presence of antioxidants in low concentrations, e.g., about one percent by weight, in a coating of an organic polymer on polyester film does not detract from the strength of the interfacial bond created by ultraviolet radiation nor does it affect the exposure required to obtain such bond. However, if the antioxidant is allowed to remain for a substantial period in a solution from which an organic polymer is coated, the antioxidant has the secondary effect of inhibiting the gradual oxidation of the organic polymer, as described above.

EXAMPLE 17

Oriented polyethylene terephthalate polyester film, 1 mil in thickness, was coated with a vinyl chloride/vinyl acetate/maleic anhydride terpolymer (86:13:1) and dried for ten minutes at 65° C. to a coating weight of 0.5 grain per 24 square inches. The interface was irradiated through the primer layer for five exposures of 12 seconds each with the B-H6 lamp.

Two portions of the polyester film were laminated together by bringing their coated surfaces into contact for five seconds at 120° C. under the pressure of several passes of a small hand roller. The resulting laminate could not be separated without tearing the film whereas a laminate prepared without irradiation but otherwise following the identical procedure could be easily separated, the delamination occurring at one of the bonds between the vinyl polymer and the polyester film.

One-inch wide laminates prepared with and without irradiation were tested on an Instron Tensile Tester. The laminate was initially peeled apart at one end, and each layer of polyester film was connected to one jaw of the tester. The jaws were moved directly apart at a speed of two inches per minute to effect a test of resistance to stripping at a 180 degree angle. The test results along with data obtained from the following examples are shown in Table H.

Pieces of the coated and irradiated polyester film were heat-sealed to provide packages of excellent strength and clarity for various articles such as items of hardware. A package of steel nuts and bolts were subjected to extremely rough handling without showing any evidence of wear.

EXAMPLE 18

Aluminum foil coated with the vinyl terpolymer of the preceding example was laminated to the coated and irradiated polyester film of the preceding example. Compared to laminates prepared using non-irradiated polyester film which could be easily delaminated, a laminate was obtained which could not be separated without tearing the polyester film unless considerable caution was exercised in effecting the delamination.

Test results using the Instron Tensile Tester as described in the preceding example are given in Table H. In the case of the unirradiated sample, the delamination occurred cleanly between the vinyl polymer layer and the polyester film. The irradiated sample delaminated at places between the vinyl polymer polyester film and at other places between the vinyl polymer and aluminum, at the much higher forces indicated.

EXAMPLE 19

The procedure of the preceding example was followed using asbestos paper instead of aluminum foil, and tests using the Instron are recorded in Table H. The non-irradiated sample delaminated cleanly between the vinyl terpolymer and the polyester film.

Laminates were also prepared with the coated and irradiated polyester laminated to several kinds of paper including rag paper and several kinds of kraft paper. In each case the paper failed internally during tests attempting to evaluate the strength of laminates with coated and irradiated polyester film, whereas in the absence of irradiation, the bond between the polyester film and the vinyl terpolymer was broken cleanly without injury to the paper.

EXAMPLE 20

A 0.1 mil dry coating of butadiene/acrylonitrile (55:45) copolymer on oriented polyethylene terephthalate polyester film was exposed through the coating twice for a total of eight seconds to light from the B-H6 lamp at a distance of about 2¾ inches. This primer coating was then overcoated with a heat-sealable adhesive based on phenolic resin and the same rubbery copolymer using a knife coater with the knife set at 1.5 mils and dried at 65° C. for ten minutes.

Two strips of the coated and irradiated film were laminated together by joining their coated surfaces for five seconds at 120° C. under the pressure produced by a small hand roller.

A one-inch wide piece was cut from the heat-cured laminate and tested on an Instron Tensile Tester at a crosshead speed of 2 inches per minute, and the results are compared in Table H to a laminate identically prepared except for the irradiation step. One of the bonds between the primer coating and polyester film was broken cleanly in the non-irradiated sample whereas the irradiated sample delaminated in some areas between one primer-to-polyester bond and in other areas between the other primer-to-polyester bond. Appreciably higher forces were required to break the bond of the irradiated sample.

EXAMPLE 21

Aluminum foil was coated with the adhesive used in the preceding example and with the knife coater set at 1.5 mils. After drying, the aluminum was laminated to samples of the irradiated and non-irradiated polyester film of the previous example. The Instron tests of the laminates are given in Table H. The bond between the polymeric primer layer and the polyester film broke cleanly in the non-irradiated sample, whereas the bond between the adhesive and the aluminum of the irradiated sample was the source of failure.

EXAMPLE 22

The procedure of the preceding example was followed except that asbestos paper instead of aluminum was used. In addition, the samples were heat aged for 96 hours at 125° C. before being tested on the Instron Tensile Tester. The non-irradiated sample delaminated during the heat aging at the interface between the primer layer and polyester film. The same bond was the source of failure when the irradiated laminate was torn apart on the Instron. The results of the tests are shown in Table H.

*Table H*

| Example | Laminate of polyester film and— | Stripping force, oz./in. | |
|---|---|---|---|
| | | No irradiation | Irradiated |
| 17 | Polyester film | 1 | Film tears |
| 18 | Aluminum foil | 17 | 37 |
| 19 | Asbestos paper | 0.5 | Film tears |
| 20 | Polyester film | 60 | 80 |
| 21 | Aluminum foil | 70 | 100 |
| 22 | Asbestos paper [1] | 0 | 35 |

[1] Aged 96 hours at 125° C.

EXAMPLE 23

A tensilized polyethylene terephthalate polyester film was coated with a thin layer of butadiene/acrylonitrile (55:45) copolymer from solution and dried. After irradiation with a B-H6 lamp, this primer layer was overcoated with a heat-activatable adhesive as in Example 20. The treated film was pressed against the flat surface of a block of cork and laminated thereto on a hot plate for ten seconds at about 150° C. The resulting laminate could not be peeled apart without tearing the cork.

A similarly prepared cork laminate using non-irradiated tensilized polyester film also could not be separated without tearing the cork. However, after about a month of storage at room temperature, it was found that the non-irradiated laminate was easily peeled apart where as that prepared with irradiation is still firmly bonded after more than six months and cannot be delaminated without tearing the cork.

In a number of other cases, a marked improvement in aging characteristics has been noted in bonds between organic polymers and polyester films after irradiation with ultraviolet light. By way of example, seemingly satisfactory rolls of pressure-sensitive adhesive tapes have been prepared on polyester backings without ultraviolet irradiation, but after several months' storage, difficulty is often encountered in unwinding the tapes without delamination.

Although a large number of constructions including interfacial polymer-polyester bonds created by a suitable exposure to ultraviolet light have been stored for extended periods at room temperatures and examined periodically, in no case has any decrease in the strength of such bond been perceived.

EXAMPLE 24

In this example, a cloth prepared from filaments of polyethylene terephthalate having 3 denier per filament, 20/1 cotton count, 74×58 construction, and weighing 5.4 ounces per yard was used. The fabric was obtained from the Du Pont Company under the designation "Dacron" 70204. The samples used in this example measured three by four inches and were cut from a piece which had been thoroughly scoured to remove as many foreign elements as possible.

Pieces of cloth were impregnated in one of four organic polymers by dipping in a porcelain evaporating dish containing the coating material until thoroughly wet and passed between rubber rollers under constant pressure to remove excess liquid. The polymers were:

(A) Five percent solution in toluene of a butadiene/styrene copolymer marketed under the U.S. Government designation X-274 and stated to have a charge ratio of 70.8 parts butadiene to 29.2 parts styrene.

(B) Five percent solution in a mixture of toluene, methyl ethyl ketone, and heptane of polychloroprene, specifically neoprene 735, a product of the Du Pont Company.

(C) Butadiene/styrene copolymer latex marketed under the U.S. Government designation GRS 1500 and analyzed to contain about 23.5 percent combined styrene, diluted with water to contain three percent solids.

(D) Polychloroprene latex, i.e., neoprene 735, diluted with water to contain three percent solids.

The impregnated pieces of cloth were irradiated with the B-H6 lamp at a distance of 2¾ inches and from each side for various exposures to a minimum of 5 minutes, after which they were immersed in toluene for one hour and subjected to occasional shaking. The samples irradiated for five minutes from each side showed a substantially improved retention of the rubbery polymer as compared to non-irradiated samples while samples given lesser exposures showed a lesser improvement. Pertinent data are recorded in Table J and includes as a percentage the weight of the polymeric impregnant relative to the weight of the cloth sample. The weighing followed thorough drying of the sample and was done under conditions of constant temperature and humidity. Each entry in Table J is the average of two samples.

Table J

| Polymeric impregnant | Exposure on each side | Percent dry pickup | Percent retention after 1 hr. in toluene |
|---|---|---|---|
| A | 0 | 3.4 | 0 |
|   | 5 min | 3.8 | 66 |
| B | 0 | 3.7 | 19 |
|   | 5 min | 3.5 | 70 |
| C | 0 | 2.7 | 2 |
|   | 5 min | 2.3 | 29 |
| D | 0 | 2.8 | 37 |
|   | 5 min | 2.8 | 61 |

The increased retention of the polymeric impregnant could have resulted from one of two phenomena; the curing of the rubber by virtue of its exposure to the B-H6 lamp or an improved bond between the impregnant and the polyester fibers. In an effort to determine the basis for the improvement, the experiment was repeated for the butadiene/styrene copolymer solution labelled "A" above and for the polychloroprene solution designated as "B." Some samples were irradiated on each side for the period indicated by a light rich in ultraviolet radiation; others were held under a 250 watt infrared lamp for 5 minutes on each side; and another group was placed in an air-circulating oven for 15 minutes at about 150° C. The temperature under the infrared lamp as determined by a glass thermometer was 68-70° C. while the temperature under the B-H6 lamp was 34-38° C.

The samples were immersed in toluene for one hour and the percentage of the polymeric impregnant retained in each case after immersion is noted in Table K.

Table K

| Treating solution | Exposure | Percent dry pickup | Percent retention after 1 hr. in toluene |
|---|---|---|---|
| A | 0 | 3.8 | 0 |
|   | 5 min. each side under B-H6 lamp. | 3.7 | 67 |
|   | 5 min. each side under infrared lamp. | 3.6 | 0 |
|   | 15 min. in oven at 150° C. | 3.3 | 0 |
| B | 0 | 4.0 | 23 |
|   | 1 min. each side under UA-15 lamp. | 3.7 | 66 |
|   | 5 min. each side under infrared lamp. | 4.0 | 26 |
|   | 15 min. in oven at 150° C. | 3.5 | 46 |

In an experiment following the procedure of this example, it has been shown that polybutadiene/styrene can be permanently impregnated in fabrics of mixed wool and tensilized polyethylene terephthalate fibers by virtue of ultraviolet radiation whereas the same organic copolymer without such irradiation is removed by immersion in toluene.

EXAMPLE 25

Pieces of fabric woven from oriented, high strength polyethylene terephthalate polyester fabric were coated by immersion in the butadiene-styrene solution designated as "A" in the preceding example. One sample was irradiated with a B-H6 lamp as described in that example while another was not irradiated and served as a control.

Each sample was then subsequently immersed in a 10 percent solution of a yellow, oil-soluble, organic azo dye in equal parts of toluene and methyl ethyl ketone at 65° C. for one hour. After removal, the samples were dried for 15 minutes at 65° C. and then rinsed three times in water containing about 0.1 percent of sodium lauryl sulfate and twice in water containing about one percent methyl ethyl ketone. The samples were then immersed for 30 seconds in methyl ethyl ketone.

This treatment removed all dye from the non-irradiated control sample while the irradiated piece appeared to have been unaffected. Further treatment of the irradiated sample with petroleum ether and perchloroethylene failed to remove the dye.

EXAMPLE 26

The problem of applying dyes, inks and paints to high polyester film has also received considerable attention, but heretofore with little success.

A pair of samples of tensilized polyethylene terephthalate polyester film was coated with an oil-modified alkyd resin applied from solution. One was exposed through the alkyd to the B–H6 lamp at a distance of 2¾ inches for a total of 60 seconds in 5 separate exposures while the other was baked at about 65° C. for one hour in the absence of ultraviolet irradiation to serve as a control. A portion of each was overcoated with an enamel containing an opaque black organic pigment in a resinous vehicle marketed by Du Pont de Nemours and Company under the tradename "Dulux." Another portion of each was overcoated with an enamel containing a translucent red organic pigment in the same vehicle.

After drying, the enameled samples were subjected to simulated weathering by exposure in an Atlas twin-arc "Weather-Ometer" under alternate wet and dry conditions for two days, which is roughly the equivalent of three months outdoor exposure. The samples were then tested by applying strips of pressure-sensitive adhesive tape against the enameled surfaces and then jerking the tape away. In some cases the coatings were first lightly scored with a sharp-pointed instrument. Portions of the enamels and the underlying coating were removed from the oven-cured samples, whereas the irradiated samples were unaffected.

EXAMPLE 27

A 1.5 mil layer of a 7.5 percent solution poly-beta-diethylaminoethyl methacrylate quaternized with allyl chloride was coated on one-mil tensilized polyethylene terephthalate film, dried, and exposed to the B–H6 lamp for about 12 seconds. Rinsing exposed and unexposed films with hot water resulted in complete removal of the unexposed coating. The exposed coating was not removed by this treatment nor by immersion in water for more than six months.

A sample of polyester film coated with this material was tested under conditions designed to produce fogging, i.e., the formation of water droplets on the film. It was found that whereas the uncoated side of the polyester was readily fogged, the coated side remained clear. This anti-fogging property is particularly useful in view of the excellent clarity and high resistance to abrasion of the polyesters for potential use in goggles, solar stills, windows and mirrors.

The same polymeric material has been used to coat oriented polyethylene terephthalate polyester cloth in an effort to lend antistatic properties to the cloth. The coated cloth after irradiation from each side with the B–H6 lamp had good antistatic properties. Standard laundering for one hour (70° C., pH about 10) did not remove the coating as indicated by weight tests.

EXAMPLE 28

A number of high strength polyester tapes having thermosetting adhesives have been fabricated in the practice of this invention. By way of example, a one-mil tensilized polyethylene terephthalate polyester film was coated with a heat-activatable adhesive based on a butadiene/acrylonitrile copolymer and a phenolic resin to a dry weight of 0.5 grain per 24 square inches. This was exposed to the B–H6 lamp for about eight seconds from a distance of 2¾ inches and then overcoated with another 4 grains per 24 square inches of the same adhesive. The resulting tape could be stored in rolls and subsequently unwound without delamination. A sample wound upon itself and cured for 30 minutes at 135° C. formed a strong laminate.

Another tape was prepared by coating both sides of tensilized polyethylene terephthalate film to a 0.5 grain dry weight per 24 square inches with the same heat-activatable adhesive and irradiating both sides. One side was then coated with 4 grains of the same adhesive per 24 square inches. This tape could also be wound upon itself and unwound without any delamination. A sample wrapped upon itself and cured for 30 minutes at 135° C. was strongly bonded to itself. Attempts to separate the layers resulted in tearing of the polyester film.

EXAMPLE 29

Cords prepared from oriented, high strength polyethylene terephthalate polyester fiber suitable for use as cords for automobile or truck tires were used in this example. Specifically, the cords were obtained from Du Pont de Nemours and Company under the designation "Dacron" S60 and consisted of 250 untwisted filaments of 1100 denier. The cords were coated with a five percent solution of natural rubber in heptane and air dried for fifteen minutes. Two cords were then exposed to a B–H6 lamp from a distance of 2¾ inches for about 12 seconds on each side while two others were not irradiated to serve as a control. The cords were then placed in a mold in which they were held firmly in an upright position, and a composition used for a natural rubber truck-tire carcass was added. After vulcanization at 155° C. under a platen pressure of 10,000 pounds for 40 minutes, the samples were removed and torn apart on an Instron Tensile Tester at a crosshead speed of 0.2 inch per minute. The samples irradiated with ultraviolet light showed an average improvement of more than 25 percent in the force required to tear them apart as compared to the non-irradiated cords.

In this specification, "crude rubber" and "natural rubber" are used to define Hevea rubber or equivalent rubber obtained from natural sources.

Products resulting from the method of this invention are adaptable to an extremely wide range of uses, the scope of which can only be realized by reciting a portion of those which have received consideration at the date of this application and which are limited only by the uses to which polyesters of the type herein described are applicable.

Numerous examples have been given of the construction of pressure-sensitive adhesive tapes from backings of this polyester film and, in addition, several examples of laminated constructions such as those which can find application for vapor barriers and thermal insulation either alone or as sealable sheets for the packaging of articles of commerce such as hardware, tobacco, foodstuffs, lubricants, chemicals, compositions of chemical nature and the like. It is even possible by using such multicomponent systems to provide not only tough, durable packages in which the enclosure is protected against deterioration by the incorporation of an inert gaseous medium, but also padding batts with particular desirable properties conferred by enclosing reactive gases together with desirable bulk materials such as for insulation.

The application of sheets of polyester as a protective and/or decorative coating offers a wide field of practical utility such as for leather goods, as shoes and luggage; for protective coverings over metal in lining containers, as cans, drums, pails, etc.; for promoting desirable surface finishes on aircraft parts; for reinforcing glass to increase shatter-resistance and for covering synthetic resinous construction products prepared therefrom, such as plastic pipe or retroreflective sheeting, to give additional desirable properties.

There is extensive applicability of polyester films bonded to mica or metals in electrical components of potential value for many uses, including civilian and military aircraft, as for printed circuits, insulation and dielectrics, and, in construction of such items of general use as escutcheon plates, by incorporating desirable decorative effects of synthetic resins with the toughness of the polyester film. In addition, films may be laminated to fabrics and wood veneers to give greater durability, and, when decoratively prepared, as by printing of designs such as of wood-grain effects on the polyester film, greater esthetic appeal and attractiveness.

The decoration of polyester films by printing thereon is possible by making the surface receptive to ink, which is made possible by application of the principles of this invention, and such printing also encompasses the bonding of metallic materials as in the formation of printed circuits. Alteration of the surface characteristics is also possible to establish extremes of hydrophilicity of value in coating with hydrophilic material such as gelatin photographic emulsions, and for uses in which wetting with water is desirable as for the condensing surfaces of solar stills and for applications in which an anti-fogging surface is desired as in non-correcting spectacle lenses for goggles of the types worn by aviators and deep sea divers, etc. Conversely it is also possible to effect hydrophobization of the surface for applications where such an effect is desired as for possible use in temporary structures such as for horticulture or for shelter as in tents and also to effect a repellency of the surface as a low-adhesive backsize for pressure-sensitive adhesive tapes. Likewise the application of suitable materials as antistatic coatings is possible and of considerable value, for example, on motion picture film.

It is additionally possible to apply these treatments to vapor-coated metallized polyester films and thus achieve further desirable combinations of effects and such metallized polyester films can be incorporated in colored laminates to give decorative materials which may be further cut to thin, colored, metallized filaments of use in textiles. Other applications in apparel where the properties of the film are desirable are also possible, as in protective garments with sealed seams. Such garments may be of the ordinary type of raincoats incorporating decorative treatments or may be of the type of disposable garments for operation where dangers exist due to disease organisms, radioactive dust or other hazards such as reactive fumes. Other applications with sealed seams include packaging mentioned above, balloons, etc.

The enumeration of potential uses is, of course, not complete, and other applications will occur when the desirable properties conferred on these polyester films by the method of this invention and as herein disclosed are known. Similar desirable properties are also conferred on filaments of these polyesters and find particular applicability for adhering the fibers to other materials such as rubber, as in tires, brushes, etc., and for imparting desirable surface properties such as receptivity to ink, dyestuffs, antistatic coatings, and for the adhering of retroreflective glass beads for making yarns for use in garments with reflective properties.

The examples following, while being directed to the formation of new and useful packaging films and the like, also illustrate the utilization of the method particularized in the preceding examples in the self-bonding together of a wide variety of polymers.

EXAMPLE 30

A laminate obtained by extruding polyethylene onto oriented polyethylene terephthalate film was irradiated through the polyethylene layer for 30 seconds with a Hanovia UA-15 lamp. The irradiated laminate had a good appearance and was strong, much stronger than the laminate before irradiation.

Another laminate was prepared using tensilized polyethylene terephthalate polyester film which had been coated with a thin primer layer of polychloroprene and irradiated through the primer for 8 seconds with a General Electric B-H6 lamp at a lamp-to-film distance of 2¾ inches. Polyethylene was extruded onto the primed side of the polyester film, but the bond between the polyethylene and the polychloroprene was undesirably weak. After irradiation through the polyethylene layer with the UA-15 lamp for 30 seconds, a strong, commercially useful laminate was obtained.

Another procedure has been found to provide excellent laminates of polyester and polyethylene films. Oriented polyethylene terephthalate polyester film 2 mils in thickness and polyethylene film 4 mils in thickness were laid together on a hot plate preheated to about 120° C. By passing a roller under moderate hand pressure over the films several times for a period of about 5 seconds, the polyethylene flowed sufficiently to form an interface with the polyester film. This interface was irradiated for 30 seconds through the polyethylene layer with the Hanovia UA-15 lamp.

Samples of each of the polyethylene-polyester laminates prepared as described in this example were tested by heat-sealing each to an identical sample with the polyethylene layers fused together under pressure. In each case, attempts to effect mechanical delamination of these panels failed due to tearing of the films. In contrast, heat-sealed panels prepared by joining polyethylene-polyester laminates which were identically prepared except for the omission of the irradiation step can always be peeled apart mechanically, delamination occurring between the fused polyethylene layer and one of the polyester layers. Where the procedure of joining the preformed polyethylene film to polyester film on a hot plate is followed without subsequent irradiation of the interface, heat-sealed panels prepared therefrom sometimes fall apart before they can be tested.

Delamination at the polyethylene-polyester bond of the panels prepared by heat-sealing the irradiated polyethylene-polyester laminates can be effected through the use of solvents which dissolve the polyethylene. However, even following this procedure an ultra-thin residue of polyethylene can generally be detected on the polyester film. This phenomenon indicates that the strong adhesion between the polyethylene and polyester films is not a mere mechanical interlocking aided by secondary valence forces, but is the result of primary chemical bonds. This phenomenon is also evidenced with other film combinations, such as those of Examples 35 and 36. Because the chemical interfacial bonding is not accompanied by any perceptible change in the properties of the films, it follows that the gross chemical effect is at the interface of the films.

EXAMPLE 31

Hermetically sealed flexible packages were prepared by heat-sealing two sheets of laminated film around 3 edge areas, filling with a mixture of a liquid polythiopolymer-captan ("Thiokol LP-3") and a small portion of a liquid tertiary amine, and then heat-sealing the remaining edge area. The liquid mixture is useful as a component of resin-forming compositions. In one case the laminated film was prepared by extruding 4 mil polyethylene film onto a 1 mil tensilized polyethylene-terephthalate film and then irradiating the interface thus formed with the B-H6 lamp for 15 seconds through the polyethylene. In the other case a commercially available laminate of polyethylene and tensilized polyethylene-terephthalate was employed. Both packages were formed with the polyethylene film on the inside serving as the heat-sealing member, an area about ⅛ inch in width providing a sufficient seal.

The pouches were placed in a desiccator heated to 125° F. at 100% relative humidity. After 5 hours, the pouch prepared from material obtained from regular commercial channels began to show delamination as evidenced by bubbles between the polyethylene and the polyester films. After 24 hours, this pouch was completely delaminated whereas the irradiated laminate showed no deterioration. Similar envelopes have successfully contained these and other difficulty-packaged resinous materials for many months at normal room and storage temperatures, where envelopes made with the previously available laminates have invariably failed in such use by delamination.

The following example illustrates the manner in which large scale production of the preferred polyethylene-polyester films of this invention is presently carried out.

EXAMPLE 32

Onto a moving web of oriented polyethylene-terephthalate polyester film is extruded a soft plastic film of polyethylene, the temperature of the polyethylene at the point of extrusion being maintained between about 450° F. and about 550° F. The temperature of this material at the point of its extrusion onto the polyester web, while subject to variation, is of practical importance in that much higher temperatures than the range mentioned tend to degrade the polyethylene and substantially lower temperatures than those mentioned may result in incomplete interfacial contact between the polyester web and the extruded polyethylene film. To assure continuous interfacial contact of the extruded film and the polyester, the polyethylene is extruded onto the polyester web in the nip of a pair of pressure rollers thereby positively pressing the polyethylene and polyester against one another immediately following the extrusion and while the polyethylene is still in a soft plastic state.

After the extrusion coating operation and while maintaining the coated web in a heated state, e.g., in the softening range of the polyethylene and usually between about 225° and 300° F., the coated web is exposed to a short period of high intensity ultraviolet irradiation from an artificial source which firmly bonds the coating and the polyester web to one another at the interface of the coating with the polyester. Since the polyester film absorbs ultraviolet light of wavelengths that pass through atmospheric air, whereas the polyethylene is transmissive of radiations of these wavelengths, it has been found to be preferable that the web be exposed to the ultraviolet irradiation from the polyethylene side.

The ultraviolet irradiation is provided by a bank of 36 watt input, low-pressure, germicidal lamps marketed as G36T6 by General Electric Company, mounted to be within one-half to two inches from the coated web. These lamps produce strong emission at a wavelength of about 2537 A.

While the coated web can be exposed to the ultraviolet irradiation at lower temperatures than the softening range of the polyethylene, such lower temperatures slow the rate of the bonding reaction. Higher temperatures can also be used; however, they do not accomplish any useful purpose and may melt the film layers.

Using the low pressure lamps indicated, 2.5 mil thick films composed of one half mil thick tensilized polyethylene-terephthalate polyester film overcoated with 2 mil thick layers of polyethylene and held at temperatures in the softening range of the polyethylene have been consistently well bonded by 6 to 8 second exposures of the coated film under the lamps, the interfacial union of the film layers being mechanically stronger than either the polyethylene or the polyester layer; for 1.5 mil thick films each composed of a one half mil tensilized polyethylene-terephthalate polyester films overcoated with a 1 mil polyethylene layer, a 5 to 6 second exposure time has been generally sufficient to create an interfacial union of the same order. In all of these exemplary instances, films were maintained at a temperature in the range of about 225 to 300° F. when subjected to the ultraviolet irradiation.

These times are not mandatory and variations in the exposure times occur with variations in ultraviolet intensity, with different batches of polyethylene and different polyethylene thicknesses, the presence or absence of pigmentation in the polyethylene, as well as with other factors such as vaariations in the temperature of the film as previously indicated; consequently, it is to be understood that the times given herein are not critical to the practice of the invention.

As a rule of thumb, the thinner the coating polyethylene layer, the shorter the exposure time necessary to firmly adherently bond the coating layer to the polyester layer. However, longer exposure times than necessary to strongly anchor the polyethylene to the polyester are not apparently harmful to the coated film and irradiation exposures of half an hour and longer result in no measurable or apparent film degradation or loss of anchorage of the coating layer to the polyester layer.

A simple "slip sheet" test has been devised to test the strength of the bond between the polyester and the polyethylene. To carry out this test a small sheet, or piece, of polyester is slipped in place on top of the polyester web to be coated with polyethylene. The web, with the slip sheet on a portion thereof, is then coated with polyethylene in the usual manner. The slip sheet covers a small portion of the web and on this portion the slip sheet is of course coated with the polyethylene leaving the web area underneath bare of such coating.

After the polyethylene layer is firmly anchored by irradiation to the polyester, a section of the thus formed polyethylene-polyester film about twice as wide as the slip sheet and containing the slip sheet is cut from the main body of the film and folded over so that the polyethylene abuts itself.

A one inch wide section of the folded over film including about a one-half inch wide portion of the slip sheet is then heat-sealed between a pair of heat-sealing jaws, heated to 375° F. and held at a pressure of about 60 pounds per square inch for about two seconds. After heat-sealing, one inch wide test strips about two inches long are cut out of the heat-sealed section in a direction perpendicular to the length of the heat-seal in such a manner that one end portion of the test strip is the heat-sealed portion, composed of top and bottom polyester layers and intermediate polyethylene layers heat-sealed to one another, and the other end portion is in the form of two tabs. The first tab is composed of the top polyester layer, the heat-sealed intermediate polyethylene layers and the underlying slip sheet. The second tab is composed of the portion of the bottom polyester layer which was underneath the slip sheet. With this arrangement, any attempt to pull the tabs apart is essentially an attempt to disrupt the polyester to polyethylene bond.

Tensile tests on test strips of polyester-polyethylene films of one-half mil thick polyester overcoated with from 1 to 4 mil thick polyethylene layers irradiated in accordance with the procedure of this example for commercially practical periods of from about 6 seconds for the 1 mil polyethylene overcoating to about 13 seconds for the 4 mil thick polyethylene coatings have shown that the interfacial bond between the polyester and polyethylene layers is not only as strong as the internal strength of the polyethylene, but is in fact at least as strong as the much stronger tensilized one-half mil polyester film. When the tabs of such test strips were clamped in the opposing jaws of a Suter tensile testing device (similar to the Instrom tester noted elsewhere herein) and the jaws moved away from one another, failure of the test strip invariably occurred by breaking of the single layer polyester tab when a force of between about 9 to 11 pounds was reached in moving the jaws away from one another. No delamination of the polyethylene from the polyester occurred.

These films may be easily heat-sealed using conventional unmodified cellophane packaging machinery or even by pressing with a hand iron in the formation of simple fin type seals. In machine heat-seal bonding the polyethylene layers of adjacent film portions are bonded to one another by pressing the adjacent film portion between bare heat-seal jaws at temperatures of from about 275 to about 400° F.; excellent results having been obtained within this range of heat-sealing temperatures at jaw pressures of from 20 to 60 pounds per square inch with a dwell time of the portion to heat-sealed between the jaws of from one half to two seconds. Films of one half mil thick polyester overcoated with 1 to 4 mil thick layers of polyethylene and heat-sealed at 375° F. at a jaw pressure of about 60 pounds and a dwell time of about two seconds have, in our experience, usually displayed a heat-seal strength when tabs extending beyond the heat-sealed seam were clamped between the opposing jaws of the tensile tester, of from about ten to about seventeen pounds per inch of seal width before rupturing the heat-seal bond, the rupturing force increasing as the polyethylene thickness increases. Further, the rupture always occurred either through splitting within the polyethylene or through film breakage.

Lightweight, low motor oil packaged in heat-sealed packages of two and one half mil thick film prepared in accordance with this example (½ mil "Mylar" and 2 mil polyethylene) stored for a period of 180 days at temperatures on the order of 120° F. at 95% relative humidity showed a weight change of less than 4/10 of 1% and no evidence of delamination between the polyethylene and the polyester layers, although it is known that this oil permeates polyethylene films in much thicker layers than 2 mil.

Hydraulic fluid packaged in heat-sealed packages of the same film under the same conditions and for the same period of time showed a weight change in this period of time of less than 5/10 of 1%.

The thin, high strength, heat-sealed films made in accordance with this example display excellent low-temperature flexibility and are particularly useful for replacing rigid containers in the packaging of pickles, sauerkraut, relishes, vegetable oils and vegetable oil containing foods. Foods packaged in heat-sealed packages of these films may be subjected, after packaging, to pasteurization temperatures as high as 235° F. for periods as long as half and hour. Packages of these films have also withstood beta and gamma irradiation dosages such as those utilized for sterilizing foodstuffs without visible degradation or delamination of the films. These films retain their flexibility at temperatures as low as —70° F. and as high as 240° F. and are unaffected by rapid temperature changes such as occur by removing a package from a freezer compartment and immersing it in boiling water. These features impart a uniquely broad filed of packaging utility to these polyester-polyethylene films, which provide a heretofore unobtainable combination of desirable properties in the film packaging field.

Where it is desired to coat both sides of the polyester layer with polyethylene, after running through the cycle described previously in this example, the film is then turned over on its back so that the remaining polyester surface is exposed and the cycle repeated. These double coated films have the advantage that both surfaces of the film are heat-sealable enabling the formation of lap seals, i.e., seals where one edge is lapped over another.

In many instances, as for example, when the polyester-polyethylene film is to be used as a transparent covering for maps, documents, or in "skin-packaging" applications, i.e., the film stretching skin tight over the packaged article, it is desirable that the polyester film be in its natural, unoriented or untensilized state to take advantage of the greater stretch of the film in this state, and such films can be made following the procedure of any of the preceding examples.

While polymeric polyester films of ethylene glycol and terephthalic acid were used in the film structures of the preceding examples, other thin, strong, tough, heat-resistant polyester polymers having polyester linkages in the polymer backbone chain, and particularly those of polybasic aromatic acids and polybasic aliphatic (including cyclo-aliphatic) alcohols, may be substituted in this preferred film construction. One such polyester is poly 1,4-bis (methylene) cyclohexane terephthalate, a polymer of terephthalic acid and 1,4-bis (hydroxymethylene) cyclohexane, marketed by Tennessee Eastman Company.

These multi-layer films are unique in the strength and chemical resistance of the union between the layers thereof, enabling the combining of film layers of widely divergent chemical and physical properties with one another in the production of packaging films having heretofore unobtainable packaging properties, and adapting them to the packaging of a wide array of difficultly packageable materials such as tobacco, foodstuffs, lubricants, chemicals, creams, soaps, caulking compounds, detergents, hardware and the like.

Numerous other multi-layer films have been made, composed of a difficultly heat-sealable organic polymer film layer and a readily heat-sealable organic polymer film layer united therewith, following the irradiation procedures of the foregoing examples as will be apparent from the examples hereinafter.

EXAMPLE 33

In one series of film prepartions five inch square film substrates of various polymeric materials were prepared. Each film substrate was warmed on a hot plate at 110° C. for one minute, the film having been flattened into place on the hot plate by means of a hard rubber hand roller. While still on the hot plate, a 4 mil polyethylene film 4½ inches square was then placed on the film substrate and the two pressed together by means of the hard rubber hand roller. The laminate thus formed was then removed from the hot plate and a portion of the polyethylene stripped back from one edge of the interface sufficiently far to permit the insertion of a narrow parting strip of polytetrafluoroethylene. The laminate was then reheated on the hot plate with the strip insertion in place and rolled flat at 110° C. on the hot plate for an additional five minutes.

Two laminates of each film substrate were so prepared and one laminate of each pair was then exposed to ultraviolet irradiation from the B–H6 lamp for a period of ten to twenty minutes, depending on the substrate film, during which time the films were cooled by a minimum flow of air just sufficient to prevent burning. The film structure so formed was then cooled to room temperature, the polytetrafluoroethylene insert removed and the laminate cut into one-half inch wide strips, the cuts being made perpendicular to the free edge of the laminate.

The bond strength between the two layers of the film structure was then tested qualitatively by manual pulling and subsequently quantitatively by means of a mechanical peel test on an Instron testing machine. The non-irradiated control sample formed by following a procedure identical to the sample to be tested with the exception that the irradiation step was not included was also tested on the Instron testing machine along with each irradiated sample.

The Instron testing machine is a conventional tensile testing device comprising a pair of upper and lower jaws vertically spaced from one another. The upper jaw is held fixed and the lower jaw can be moved away from the upper jaw at a controlled rate of speed, the force being required to maintain the controlled rate of speed being registered in ounces. In the test that follows the rate of speed at which the lower jaw moved away from the upper jaw was 2 inches per minute and the quantitative values are therefore registered in ounces per half inch width of the strips required to either delaminate the layers or break the weaker of the film layers.

To carry out the testing on the Instron testing machine, the exposed surface of the substrate film was adhesively bonded to a metal plate with the unbonded end tab of the film sample left free. Adhesive tape was then applied to the unbonded polyethylene end tab to form a tape tab serving as a handle, the tape tab then being clamped in the upper jaw of the Instron testing machine, the tab being doubled back across the metal plate at an angle of 180°. The rest of the structure, namely, the metallic plate, was then attached in a vertical position to the lower jaw of the Instron testing machine and the lower jaw pulled away from the upper jaw.

In all cases wherein the step of irradiating the interface of the film was included, the polyethylene broke, the average of the highest recorded forces registered before break for the films being about 45 ounces per half inch width of film. In all the control samples wherein the irradiation step was not included, the polyethylene invariably separated quickly and readily from the substrate film at an average force of about ½ ounce per ½ inch of film width.

The table below sets forth the list of substrate films used in this example along with their melting points and the exposure time to the B–H6 lamp of each of these films coated with polyethylene.

*Table L*

| Substrate film | M.P., °C. | Exposure time to U.V. of coated film, minutes |
| --- | --- | --- |
| 1,4-bis(methylene) cyclohexane terephthalate | 270 | 10 |
| Polycarbonate film of— $O-\underset{\underset{CH_3}{\mid}}{\overset{\overset{CH_3}{\mid}}{C}}-\overset{O}{\overset{\mid\mid}{C}}$ ⁿ | 240 | 10 |
| Hexamethylene adipamide, (Nylon 6,6) | 263 | 20 |
| Polycaprolactam, (Nylon 6) | 240 | 20 |
| Hexamethylene sebacamide (Nylon 6,10) | 209 | 20 |
| "Penton" film of Hercules Powder Co., which is polymer of— $O-CH_2-\underset{\underset{CH_2Cl}{\mid}}{\overset{\overset{CH_2Cl}{\mid}}{C}}-CH_2$ ⁿ | [1] 232 | 10 |
| "Durethan U₂₀" a polymer of toluene diisocyanate reacted with an adipic acid-ethylene glycol prepolymer, a product of Farbenfabriken Bayer, Leverkusen, Germany | | [2] 11 |
| Polyvinyl fluoride | | [2] 13 |
| Polyvinyl chloride | | [2] 10 |

[1] Molding temp.
[2] Exposed to 15 watt, low pressure GE-G8T5 lamp.

EXAMPLE 34

Films of low melting (about 150° F.) rubber hydrochloride, marketed as "Pliofilm" by Goodyear Tire and Rubber Co., were laminated to films of polyethylene terephthalate polyester, hexamethylene sebacamide, and hexaxylylene sebacamide, all of which have melting points above 400° F., by laying each of the latter films on a hot plate heated to about 120° C. and laminating the rubber hydrochloride film thereto by rolling with a hand roller, then immediately thereafter subjecting the laminate, through the "Pliofilm" side to irradiation by two 30 watt, low pressure germicidal lamps having strong emission at 2537 A. at a lamp-to-film distance of about 2 inches for varying periods of time. Thus, the "Pliofilm" to polyethylene terephthalate laminate was irradiated for five minutes; the "Pliofilm" to hexamethylene sebacamide laminate for 20 minutes and the "Pliofilm" to hexaxylylene sebacamide for 4 minutes.

Attempts to disrupt the interfacial bonds of the laminated films by pulling end tabs of the films apart on an Instron tensile testing machine in all instances resulted in breaking of the "Pliofilm" at a force of about fifty ounces per ½ inch of strip width, with no evidence of delamination.

The resultant laminates were easily heat-sealed with a hot flat iron held at about 250° F. and hand pressed against the folded-over portion of the laminate for about 4 seconds.

Strong heat-seals were formed in all cases, and the force required to disrupt the heat-seal bonds by pulling end tabs away from one another was in excess of 40 ounces per ½ inch of heat-seal width.

EXAMPLE 35

Oriented polyethylene terephthalate polyester film, 1 mil in thickness, was coated with a vinyl chloride/vinyl acetate/maleic anhydride terpolymer (86:13:1) and dried for 10 minutes at 65° C. to a coating weight of 0.5 grain per 24 square inches. The interface was irradiated through the primer layer for five exposures of 12 seconds each with the B–H6 lamp.

Two portions of the polyester film were laminated together by bringing their coated surfaces into contact for five seconds at 120° C. under the pressure of several passes of a small hand roller. The resulting laminate could not be separated without tearing the film whereas a laminate prepared without irradiation but otherwise following the identical procedure could be easily separated, the delamination occurring at one of the bonds between the vinyl polymer and the polyester film.

One-inch wide laminates prepared with and without irradiation were tested on an Instron Tensile Tester. The laminate was initially peeled apart at one end, and each layer of polyester film was connected to one jaw of the tester. The jaws were moved directly apart at a speed of 2 inches per minute. Attempts to delaminate the film by this test failed and resulted in tearing of the film.

Pieces of the coated and irradiated polyester film were heat-sealed to provide packages of excellent strength and clarity for various articles such as items of hardware. A package of steel nuts and bolts was subjected to extremely rough handling without showing any evidence of wear.

Although high melting, high strength polyester films provide the preferred difficultly heat-sealable portion of the films of this invention, having an unusually desirable combination of properties useful in the film packaging art, as is illustrated by the examples, polyamides and polyethers, as well as other tough, high melting polymers self sustaining in thin film form may also provide useful, but difficulty heat-sealable film layers, to which may be firmly adherently bonded lower melting, readily heat-sealable layers in the practice of this invention.

Likewise, as is illustrated by Examples 34 and 35, while polyethylene is the preferred heat-sealable layer, other low melting film forming polymer layers, heat-sealable at moderately elevated temperatures, preferably below 400° F., may be firmly anchored to higher melting difficultly heat-sealable layers by ultraviolet irradiation of the interface.

By polyethylene we contemplate poly-aliphatic hydrocarbons, e.g., polyethylene as such, as well as equivalent homologues, e.g., polypropylene, copolymers of ethylene and propylene in varying proportions, etc.

To create a firmly adherent layer to layer bond, by the use of the ultraviolet irradiation herein described, one of the film layers must be relatively absorptive of ultraviolet light that normally passes through air and particularly within the range generally emanating from artificial sources such as the lamps used in the working examples preceding, e.g., between about 1850 A. and about 3600 A., as compared to the other film layer. Where one film layer is highly absorptive of and the other film layer is comparatively transmissive to ultraviolet emanations of such wavelengths, the exposure time to the artificial ultraviolet light source to achieve firmly adherent layer to layer bonding is extremely short, as in the case of "Mylar"-polyethylene laminates. When the ultraviolet absorptivity difference between the films is less marked, the bonding time under the same irradiation source and conditions is considerably lengthened, as in the case of hexamethylene adipamide-polyethylene and some of the other laminates disclosed herein.

In many instances it is desirable to provide a film composed of film layers having similar ultraviolet absorption characteristics relative to ultraviolet light of wavelengths that pass through air. It has been found possible to coat the surface of one layer with a sensitizing coating, apparently making the coated layer sufficiently more opaque to ultraviolet light than the other layer to enable the creation in reasonably short time of a firm interfacial bond between the layers upon ultraviolet irradiation of the layer to layer interface from the side of the uncoated layer from a suitable lamp source. The following example illustrates this technique.

EXAMPLE 36

A polyvinyl alcohol film sample, placed on a smooth, aluminum foil sheet on a smooth surfaced hot plate held at 170° C., had spread thereover a thin film of benzoyl chloride. The benzoyl chloride was then allowed to evaporate from the film for a period of about 5 minutes while the film remained on the hot plate. Then, the coated film was removed from the hot plate and thoroughly washed with acetone and returned to the hot plate with the coated side exposed. When the film temperature reached the temperature of the hot plate surface, about 170° C., a layer of polyethylene was laminated thereto by hand rolling with a hand roller. The film was then cooled to about 140° C. and subjected to the irradiation of two 15 watt low pressure germicidal lamps having strong ultraviolet emission at about 2537 A. mounted in a bank spaced about 1 inch from the film for a period of 13 minutes.

A similar film sample was prepared of polyvinyl alcohol and polyethylene except that the benzoyle chloride coating step was omitted. This laminated film construction was subjected to irradiation from the bank of lamps noted above for a period of 60 minutes.

When tested as in Example 34, the benzoyl chloride coated film sample displayed no evidence of delamination or interfacial rupture, the polyethylene tearing upon attempted delamination, the highest force registered prior to tearing of the polyethylene being about 42 ounces per ½ inch of width. The sample with no benzoyl chloride coating which had been irradiated for a total of 60 minutes failed to produce any significant layer to layer bond strength and was easily delaminated, the delamination force being no higher than 7 ounces per ½ inch width.

Similarly, a cellulose acetate film was treated with benzoyl chloride and laminated with polyethylene. The resulting laminate was irradiated at 110° C. for about 10 minutes under the two 15 watt germicidal lamps previously mentioned in this example. The resultant film had a layer to layer bond strength stronger than that of the polyethylene, as evidenced by the tearing of the polyethylene film upon attempts to delaminate the layers. Here again, a similar film of cellulose acetate-polyethylene prepared as hereinbefore noted, except that the benzoyl chloride coating step was eliminated, failed to produce any layer to layer bond strength of significance and the layers readily mechanically delaminated at a force of less than an ounce.

A sample piece of cellophane film applied to a hot plate surface in the same manner as the polyvinyl alcohol film was coated with a saturated (at about 25° C.) solution of benzyle cellulose in acetone, which was then allowed to evaporate while the film remained on the hot plate at about 160° C. for 5 minutes. A film of polyethylene was then hand rolled onto the coated cellophane, the film cooled to about 126° C. and subjected to the 15 watt low pressure lamp bank noted previously in this example for about 10 minutes. Attempts to delaminate the polyethylene from the cellophane in the manner of Example 34 resulted in tearing of the polyethylene with no evidence of delamination.

A similar cellophane film sample prepared as above, with the exception that no coating of benzyl cellulose was applied to the cellophane, produced no significant layer to layer bond strength between the cellophane and the polyethylene.

In all the cases of this example both the substrate films and the heat-sealable polyethylene coatings are normally quite transmissive of ultraviolet light of wavelengths that normally pass through atmospheric air.

With certain substrate films to which it is desired to bond polyethylene or a similar heat-sealable layer, other pretreatment procedures than that of Example 36 have been found effective. One of these other procedures is described in the example following.

EXAMPLE 37

Five inch square thin substrate films were prepared of "Kel–F," chlorotrifluoroethylene polymer, a product of Minnesota Mining and Manufacturing Company, "Delrin," formaldehyde polymer having the recurring structure $OCH_2$, a product of Du Pont de Nemours & Co., and the polycarbonate film of Table L.

Figure 1:
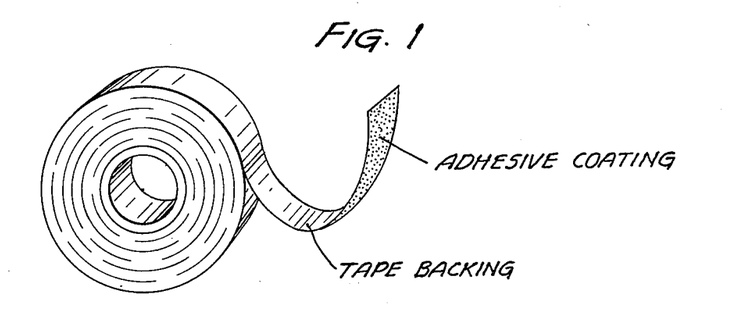
Figure 2:
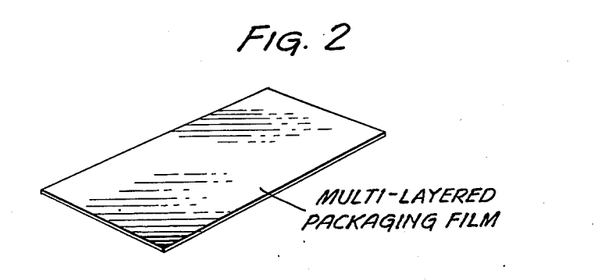
FIGURE 2 is an isometric view of a multi-layered packaging film made in accordance with this invention.
Figure 3:
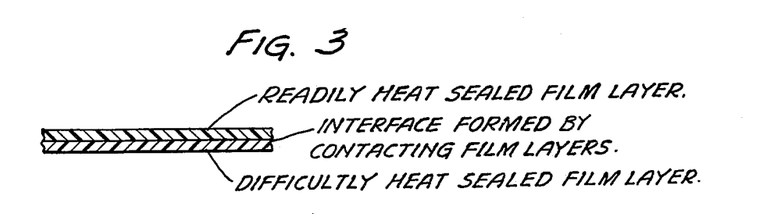
FIGURE 3 is a cross-sectional view through the film of FIGURE 2 showing the film to comprise a readily heat sealed film layer and a more difficultly heat sealed film layer bonded to one another at the interface formed by the contacting film layers.

Each of these substrate films was rolled into a tubular shape and inserted in a glass tube. The tube was then sealed at its ends by means of electrodes and air evacuated therefrom to provide a vacuum within the tube of between about 0.5 and 0.6 millimeter of mercury. Thereafter an electric current was passed between the electrodes and a visible blue glow induced within the tube, this apparatus and the manner of inducing the glow being more fully described with reference to FIGURE 1 of the copending application Serial No. 661,784, of our colleague, Gordon R. Smith, filed May 27, 1957, now abandoned.

Each of the substrate films was exposed to the glow discharge in the apparatus described for a period of 5 minutes and then removed from the apparatus.

Thereafter, a polyethylene layer about 4 mils thick, was applied to the exposed surface of each substrate film by hand roller pressing the polyethylene thereon on a hot plate and the resulting film subjected to interfacial irradiation through the polyethylene layer as described in Example 33. The "Kel–F" polyethylene film was subjected to exposure from the B–H6 lamp for 5 minutes; the "Delrin"-polyethylene film was subjected to exposure from the B–H6 lamp for 10 minutes; and, the polycarbonate-polyethylene film was subjected to exposure from the B–H6 lamp for 4 minutes.

The resulting laminates, when subjected to the mechanical peel test, described with reference to the Instron testing machine in Example 33, failed to delaminate and in all instances the polyethylene broke upon attempting to peel the layers apart.

Control film laminates of polyethylene and the substrate films of this example were also made following the procedure of this example, except that none of the substrate films was subjected to any glow discharge treatment prior to the application of the polyethylene layer thereto.

In the case of the control films of "Delrin"-polyethylene and "Kel–F"-polyethylene, no significant bond strength developed between the film layers even upon subjecting the layer to layer interfaces to ultaviolet irradition from the B–H6 lamp for periods as long as half an hour and the layers were readily delaminated by simple hand peeling. In the case of the polycarbonate-polyethylene control sample, the ultraviolet irradiation time at which a strong bond was observed was about 10 minutes, as given in Table L of Example 33, more than twice the time observed with the film laminate containing the glow discharge treated substrate noted above.

While hereinbefore we have illustrated the making of our novel films by a number of examples, and have illustrated a preferred step in combining those films involving the use of ultraviolet irradiation, it will be understood that our films are novel irrespective of their method of production, and quite apart from whether primers, or other media or techniques, are used to give the desired high bond strength between film layers, in combination with the use of ultraviolet light, or in the absence of the use of ultraviolet irradiation.

Hereinabove we have described our invention by various examples and embodiments, which are meant to illustrate our invention and not to limit it.

What is claimed is:

1. The method including the steps of (a) providing an interface between layers of materials comprising: (1) a solid linear polymeric polyester, self-sustaining in thin film form, of polybasic aliphatic alcohol and polycarboxylic aromatic acid, and (2) an organic hydrogen-containing polymer having a plurality of carbon atoms in the skeletal chain, at least one of said layers being transmissive of ultraviolet light; and (b) strongly irradiating said interface with ultraviolet light from an artificial source at an intensity and for a time sufficient to provide effective bonding of the interfacial surfaces without substantially degrading said polymers.

2. An article of manufacture comprising (a) a layer of a solid linear polymeric polyester, self-sustaining in thin film form, of polybasic aliphatic alcohol and polycarboxylic aromatic acid; and (b) a layer of an organic hydrogen-containing polymer having a plurality of carbon atoms in the skeletal chain, said article having high interfacial bonding at an interface between said layers, said interface having been strongly irradiated with ultraviolet light from an artificial source at an intensity and for a time sufficient to provide effective bonding of the interfacial surfaces without substantially degrading the polymer.

3. An adhesive tape comprising (a) a layer of a solid linear polymeric polyester, self-sustaining in thin film form, of polybasic aliphatic alcohol and polycarboxylic aromatic acid; (b) an intermediate combining primer layer consisting essentially of an organic hydrogen-containing polymer having a plurality of carbon atoms in the skeletal chain and forming an interface with said polyester layer, said interface having high interfacial bonding and having been strongly irradiated with ultraviolet light from an artificial source at an intensity and for a time sufficient to provide effective bonding of the interfacial surfaces without substantially degrading the polymer; and (c) a layer of adhesive over said primer layer strongly adhered to said primer layer.

4. An adhesive tape comprising (a) a layer of a solid linear polymeric polyester, self-sustaining in thin film form, of polybasic aliphatic alcohol and polycarboxylic aromatic acid; and (b) a layer of adhesive comprising an organic hydrogen-containing polymer having a plurality of carbon atoms in the skeletal chain and forming an interface with said polyester layer, said interface having high interfacial bonding and having been strongly irradiated with ultraviolet light from an artificial source at an intensity and for a time sufficient to provide effective bonding of the interfacial surfaces without substantially degrading the polymer.

5. A strongly bonded laminate comprising (a) a layer of a solid linear polymeric polyester, self-sustaining in thin film form, of polybasic aliphatic alcohol and polycarboxylic aromatic acid; and (b) a layer of material having a softening point substantially lower than the softening point of said solid polymeric polyester, said material comprising an organic hydrogen-containing polymer having a plurality of carbon atoms in the skeletal chain, said laminate having high interfacial bonding at an interface between said layers, said interface having been irradiated with ultraviolet light from an artificial source at an intensity and for a time sufficient to provide effective bonding of the interfacial surfaces without substantially degrading the polymer.

6. A strongly bonded laminate comprising (a) a thin film of the oriented polymeric polyester of polyethylene terephthalate and (b) a thin film of polymeric polyethylene, said laminate having high interfacial bonding at an interface between said films, said interface having been irradiated with ultraviolet light from an artificial source at an intensity and for a time sufficient to provide effective bonding of the interfacial surfaces without substantially degrading the polymer.

7. An article of manufacture comprising (a) an outer layer of a solid linear polymeric polyester, self-sustaining in thin film form, of polybasic aliphatic alcohol and polycarboxylic aromatic acid; (b) an inner layer of an organic hydrogen-containing polymer having a plurality of carbon atoms in the skeletal chain, said article having high interfacial bonding at an interface between said layers, said interface having been strongly irradiated with ultraviolet light from an artificial source at an intensity and for a time sufficient to provide effective bonding of the interfacial surfaces without substantially degrading the polymer; and (c) a solid, self-sustaining body having a surface strongly adherently bonded to said inner layer.

8. A coated sheet material comprising (a) a backing film of solid linear polymeric polyester of polybasic aliphatic alcohol and polycarboxylic aromatic acid; (b) an inner layer of an organic hydrogen-containing polymer having a plurality of carbon atoms in the skeletal chain and forming an interface with said backing film, said interface having high interfacial bonding and having been strongly irradiated with ultraviolet light from an artificial source at an intensity and for a time sufficient to provide effective bonding of the interfacial surfaces without substantially degrading the polymer; and (c) a surface coating, firmly adherently bonded to said inner layer, of particulate material in a resinous binder.

9. An article of manufacture as defined in claim 2 wherein the solid polymeric polyester is tensilized polyethylene terephthalate.

10. An article of manufacture as defined in claim 2 and further characterized in that the solid polymeric polyester is a thin film.

11. An article of manufacture as defined in claim 2 and further characterized in that the solid polymeric polyester is in filamentary form.

12. The method of improving an interfacial bond as described in claim 1 and further characterized in that the organic, hydrogen-containing polymer is polyethylene.

13. The method of improving an interfacial bond as described in claim 1 and further characterized in that the organic, hydrogen-containing polymer is a vinyl polymer.

14. The method of improving an interfacial bond as described in claim 1 and further characterized in that the organic, hydrogen-containing polymer is a vulcanizable rubbery diene polymer.

15. The process of improving the properties of polyethylene terephthalate which comprises coating the same with a chemically distinct organic hydrogen containing polymer having a plurality of carbon atoms in the skeletal chain which is at least partially transmissive to ultraviolet light at a wave length in the range of 2000–4000 A. and subjecting the coating to ultraviolet light in the absence of oxygen to form a chemical bond between the chemically distinct organic hydrogen containing polymer and the polyethylene terephthalate.

16. The process of improving the properties of polyethylene terephthalate which comprises coating the same with a chemically distinct organic hydrogen containing polymer having a plurality of carbon atoms in the skeletal chain which is at least partially transmissive to ultraviolet light at a wave length in the range of 2000–4000 A. and subjecting the coating to ultraviolet light to form a chemical bond between the chemically distinct organic hydrogen containing polymer and the polyethylene terephthalate.

17. The method which comprises (a) forming an interface between organic polymer layers, one of which is more transmissive to ultraviolet light than the other, and, (b) strongly irradiating said interface with ultraviolet light from an artificial source at an intensity and for a time sufficient to provide effective bonding of the said layers to one another at said interface without substantially degrading said polymers.

18. The method which comprises (a) interfacially contacting a layer of a difficultly heat sealable organic polymer self-sustaining in thin film form with a layer of a more readily heat sealable organic polymer, one of said polymers being more transmissive to ultraviolet light than the other, and, (b) strongly irradiating said interface with ultraviolet light from an artificial source at an intensity and for a time sufficient to provide effective bonding of the said layers to one another at said interface without substantially degrading said polymers.

References Cited by the Examiner

UNITED STATES PATENTS

| | | | |
|---|---|---|---|
| 2,679,969 | 6/54 | Richter | 229—3.5 |
| 2,765,251 | 10/56 | Williams | 161—227 |
| 2,824,026 | 2/58 | Homeyer et al. | 117—122 |
| 2,845,541 | 7/58 | Berry et al. | 250—52 |
| 2,876,067 | 3/59 | Nagel et al. | 117—138.8 |
| 2,907,675 | 10/59 | Gaylord | 117—47 |
| 2,919,059 | 12/59 | Sporka | 229—3.5 |
| 2,961,365 | 11/60 | Sroog | 161—214 |
| 2,999,772 | 9/61 | Burk et al. | 117—138.8 |

EARL M. BERGERT, *Primary Examiner.*

HAROLD ANSHER, *Examiner.*